(12) United States Patent
Berkowitz et al.

(10) Patent No.: US 8,271,259 B2
(45) Date of Patent: *Sep. 18, 2012

(54) VIRTUAL SUPERCOMPUTER

(76) Inventors: Gary Charles Berkowitz, Centennial, CO (US); Charles Christopher Wurtz, Los Alamos, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 12/824,579

(22) Filed: Jun. 28, 2010

(65) Prior Publication Data

US 2011/0004566 A1 Jan. 6, 2011

Related U.S. Application Data

(63) Continuation of application No. 10/821,582, filed on Apr. 9, 2004, now Pat. No. 7,774,191.

(60) Provisional application No. 60/461,535, filed on Apr. 9, 2003.

(51) Int. Cl.
*G06F 9/455* (2006.01)

(52) U.S. Cl. .......................................................... 703/23

(58) Field of Classification Search ............... 703/21–22, 703/23

See application file for complete search history.

(56) References Cited

U.S. PATENT DOCUMENTS

| 4,462,075 A | 7/1984 | Mori et al. |
|---|---|---|
| 4,468,728 A | 8/1984 | Wang |
| 5,072,371 A | 12/1991 | Benner et al. |
| 5,088,031 A | 2/1992 | Takasaki et al. |
| 5,101,346 A | 3/1992 | Ohtsuki |
| 5,404,512 A | 4/1995 | Powers et al. |
| 5,404,513 A | 4/1995 | Powers et al. |
| 5,442,784 A | 8/1995 | Powers et al. |
| 5,515,488 A | 5/1996 | Hoppe et al. |
| 5,553,291 A | 9/1996 | Tanaka et al. |
| 5,577,241 A | 11/1996 | Spencer |
| 5,692,193 A | 11/1997 | Jagannathan et al. |
| 5,802,290 A | 9/1998 | Casselman |
| 5,911,138 A | 6/1999 | Li et al. |
| 5,925,102 A | 7/1999 | Eilert et al. |
| 5,935,216 A | 8/1999 | Benner et al. |
| 5,944,779 A | 8/1999 | Blum |
| 5,944,783 A | 8/1999 | Nieten |
| 5,983,268 A | 11/1999 | Freivald et al. |
| 5,987,497 A | 11/1999 | Allgeier |
| 6,003,065 A | 12/1999 | Yan et al. |
| 6,003,137 A | 12/1999 | Kawasaki |

(Continued)

OTHER PUBLICATIONS

Various 2000 press releases for Veriscape, obtained via 'waybackmachine' 2006; pp. 1-9.*

(Continued)

*Primary Examiner* — Hugh Jones
(74) *Attorney, Agent, or Firm* — Edell, Shapiro & Finnan, LLC

(57) ABSTRACT

The virtual supercomputer is an apparatus, system and method for generating information processing solutions to complex and/or high-demand/high-performance computing problems, without the need for costly, dedicated hardware supercomputers, and in a manner far more efficient than simple grid or multiprocessor network approaches. The virtual supercomputer consists of a reconfigurable virtual hardware processor, an associated operating system, and a set of operations and procedures that allow the architecture of the system to be easily tailored and adapted to specific problems or classes of problems in a way that such tailored solutions will perform on a variety of hardware architectures, while retaining the benefits of a tailored solution that is designed to exploit the specific and often changing information processing features and demands of the problem at hand.

18 Claims, 9 Drawing Sheets

Pseudocode representation of the action of the Evolution Engine.

```
Evolution Engine:
Add, Delete or Modify a node
    begin
        get selected node-number from DAP
        get evolution condition (add new node, delete node, modify node) from DAP
        branch on condition
        •   Add node:      - call Instantiation procedure for NC = node-number
                            - call Population procedure for same node,
                                according to parameters specified by DAP
                            - exit
        •   Delete node:   - call Instantiation procedure (delete mode) for NC = node-number
                            - update NFI and release space in data memory via PMC
                            - exit
        •   Modify node:   - call Navigation procedure for NC = node-number
                            - modify fields in DWR-P as specified by DAP
                            - call Population procedure for NC = node-number
                            - exit
        end branch
    end
```

U.S. PATENT DOCUMENTS

| | | | |
|---|---|---|---|
| 6,012,055 | A | 1/2000 | Campbell et al. |
| 6,047,283 | A | 4/2000 | Braun |
| 6,119,101 | A | 9/2000 | Peckover |
| 6,269,391 | B1 | 7/2001 | Gillespie |
| 6,327,593 | B1 | 12/2001 | Goiffon |
| 6,397,212 | B1 | 5/2002 | Biffar |
| 6,411,950 | B1 | 6/2002 | Moricz et al. |
| 6,421,675 | B1 | 7/2002 | Ryan et al. |
| 6,453,312 | B1 | 9/2002 | Goiffon et al. |
| 6,484,162 | B1 | 11/2002 | Edlund et al. |
| 6,484,190 | B1 | 11/2002 | Cordes et al. |
| 6,563,514 | B1 | 5/2003 | Samar |
| 6,615,207 | B1 | 9/2003 | Lawrence |
| 6,732,088 | B1 | 5/2004 | Glance |
| 6,769,033 | B1 | 7/2004 | Bass et al. |
| 6,839,714 | B2 | 1/2005 | Wheeler et al. |
| 6,859,455 | B1 | 2/2005 | Yazdani et al. |
| 7,668,811 | B2 | 2/2010 | Janssens et al. |
| 7,756,750 | B2 | 7/2010 | Venkiteswaran |
| 7,774,191 | B2 * | 8/2010 | Berkowitz et al. .............. 703/23 |
| 2001/0051893 | A1 | 12/2001 | Hanai et al. |
| 2002/0016794 | A1 | 2/2002 | Keith, Jr. |
| 2002/0156695 | A1 | 10/2002 | Edwards |
| 2003/0061122 | A1 | 3/2003 | Berkowitz et al. |
| 2003/0167409 | A1 | 9/2003 | Sussman |
| 2004/0030694 | A1 | 2/2004 | Tokumo et al. |
| 2004/0128155 | A1 | 7/2004 | Vaidyanathan et al. |
| 2004/0254870 | A1 | 12/2004 | Chitaley et al. |
| 2005/0049938 | A1 | 3/2005 | Venkiteswaran |
| 2005/0193029 | A1 | 9/2005 | Rom et al. |
| 2005/0222987 | A1 | 10/2005 | Vadon |
| 2005/0273706 | A1 | 12/2005 | Manber et al. |
| 2005/0289168 | A1 | 12/2005 | Green et al. |
| 2006/0150098 | A1 | 7/2006 | Ma |
| 2008/0027830 | A1 | 1/2008 | Johnson et al. |
| 2008/0040220 | A1 | 2/2008 | Levy et al. |
| 2008/0059297 | A1 | 3/2008 | Vallier et al. |
| 2008/0221915 | A1 | 9/2008 | Berkowitz et al. |
| 2009/0094227 | A1 | 4/2009 | Berkowitz et al. |
| 2010/0191616 | A1 | 7/2010 | Berkowitz et al. |
| 2011/0004534 | A1 | 1/2011 | Venkiteswaran |

OTHER PUBLICATIONS

Massaro; 'Veriscape to deliver Rapid Derivatives Valuations'; p. 1, Wall Street & Technology, Feb. 2000.*

Spaeth; Los Alamos County to fund startups; New Mexico Business Weekly; pp. 1-3; Feb. 2002.*

Webb; Former NY e-business firm to open HQ in Los Alamos; New Mexico Business Weekly ; pp. 1-2; Sep. 2002.*

Aho, V.A., et al., "The Design and Analysis of Computer Algorithms," 1974, Reading, MA: Addison-Wesley, pp. 1-7.

Hillis, W.D. "The Connection Machine," 1985, Cambridge: MIT Press, pp. 1-6.

Hull, J.C. "Options, Futures, and Other Derivative Securities (2nd Ed).," 1993, Englewood Cliffs: Prentice-Hall, pp. 1-9.

Jorion, P. "Value at Risk," 1997, New York: McGraw-Hill, pp. 1-4.

Knuth, D.E. "The Art of Computer Programming.," 1968, Reading, MA: Addison-Wesley, pp. 1-8.

Lawrence, D. "Measuring and Managing Derivative Market Risk," 1996, London: ITP, pp. 1-6.

* cited by examiner

FIG. 1. NVSI System Configuration Overview
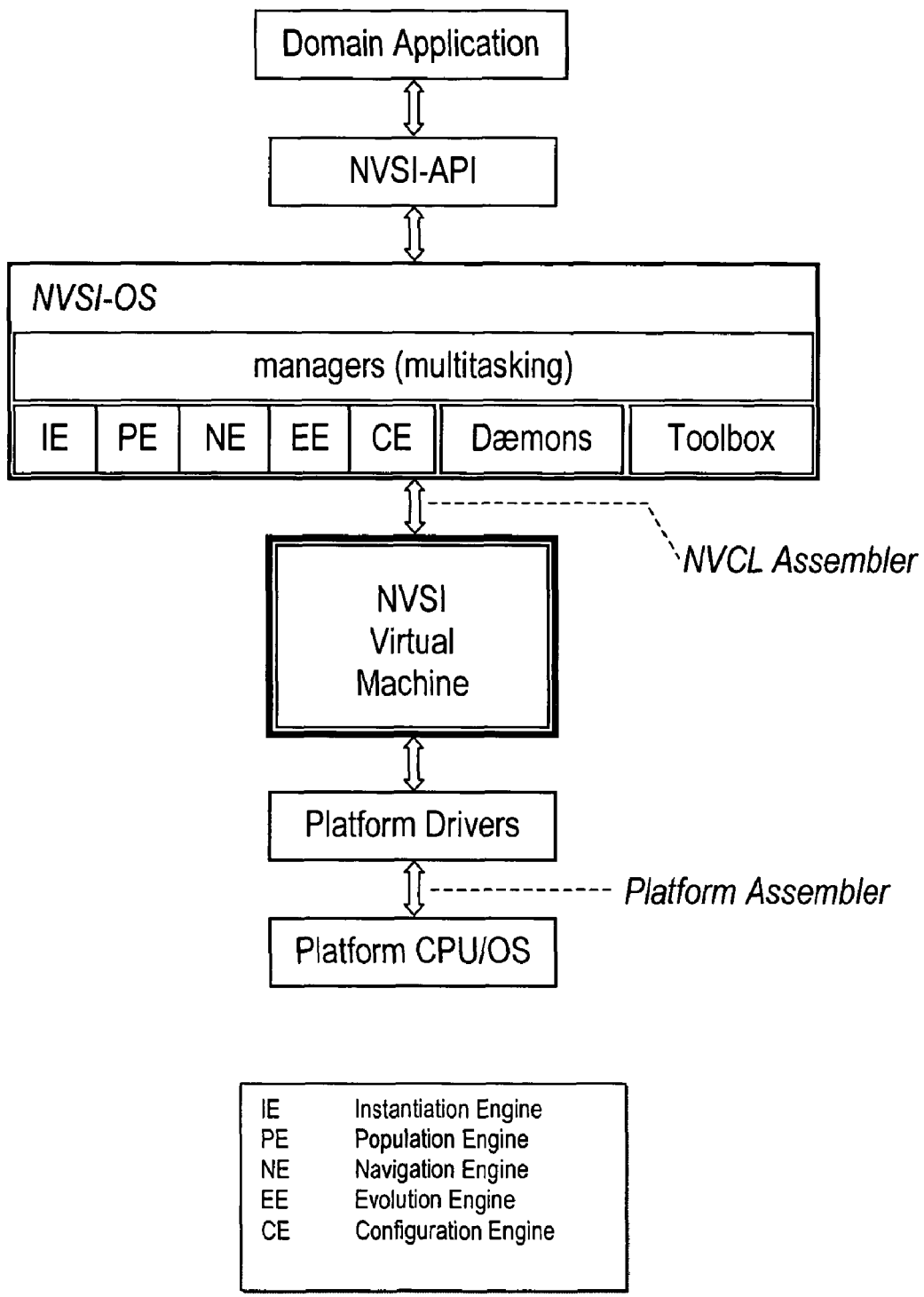

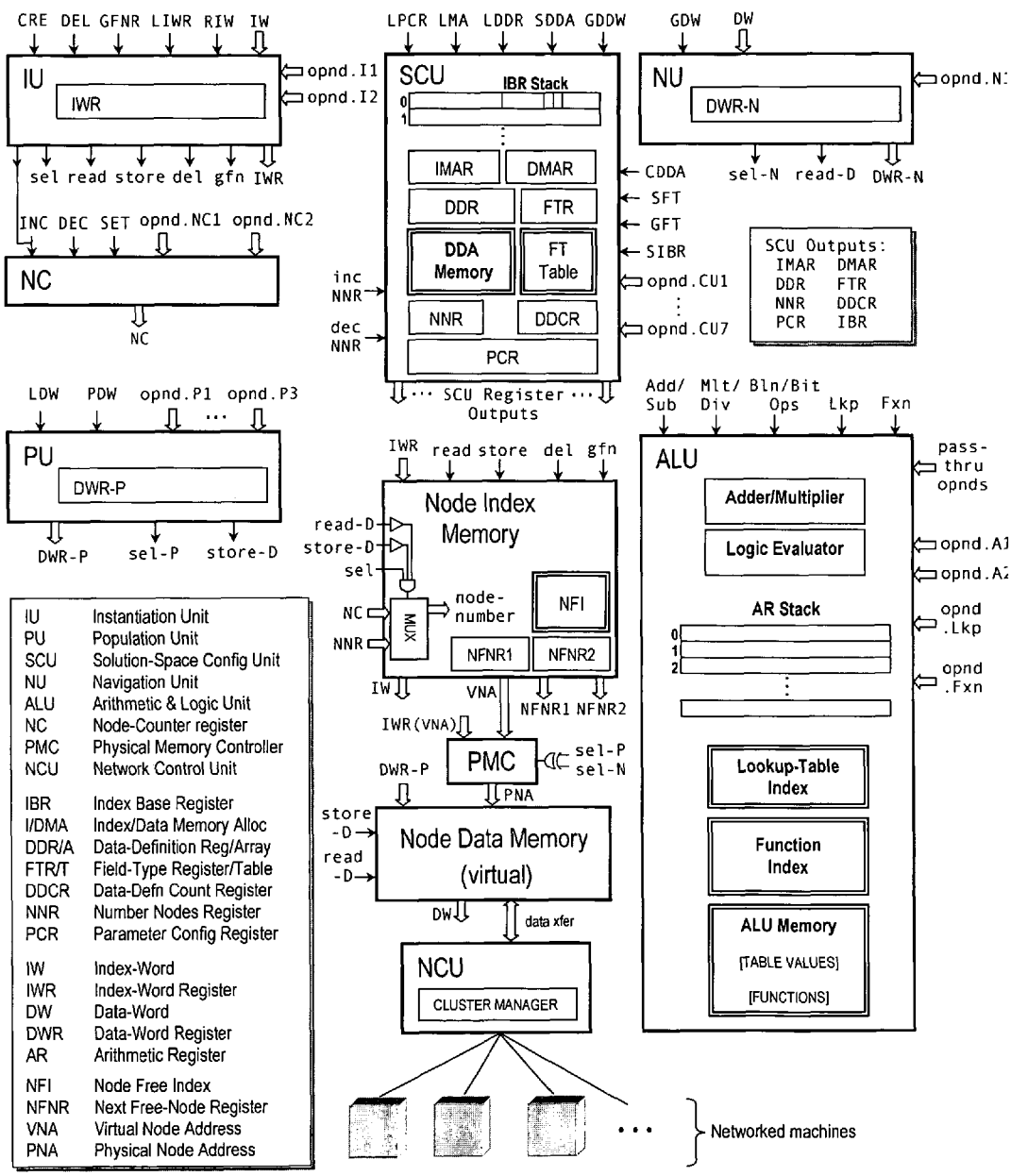
FIG. 2. NVSI Virtual Machine Components and Logical Interconnections

FIG. 3. Pseudocode representation of the action of the Configuration Engine.

---

Configuration Engine:

*Create & store* m *data definition words (DDW)* begin for *DDnum* = 1 to *m* do    ; *m* is the number of different data-word definitions
                                                ; in the domain solution-space (data memory).

- create a data definition word (DDW) in register (DDR),
    according to parameters specified by Domain Application Program (DAP)

- store DDW into the DD array in Configuration Unit end do end

FIG. 4. Pseudocode representation of the action of the Instantiation Engine.

---

Instantiation Engine:

*Create n Nodes* begin for *Node-Counter* (NC) = 1 to *n* do     ; *n* is the number of nodes in the domain
                                                    ; solution-space (data memory) to be created.

- create index-word (IW) in register (IWR) in the Instantiation Unit

- store IWR into Index Memory at node-number (address) = NC

- allocate space in node Data Memory at Virtual Node Address (VNA) calculated by the Data Memory internal memory manager, based upon parameters in the corresponding DDW end do end

FIG. 5. Pseudocode representation of the action of the Population Engine.

Population Engine:

*Populate (evaluate & store) n nodes* begin for *Node-Counter* (NC) = 1 to *n* do    ; *n* is the number of nodes in the domain
                                                             ; solution-space (data memory) to be created.

- read IW from Index Memory at node-number (address) = NC

- read DDW pointed to by DDN in IW

- evaluate all fields in the Data Word according to the corresponding DDW

- create Data Word in DW register (DWR-P) in Population Unit if Length-Data-Word changed then
- memory manager compute new VNA
- store new VNA into corresponding IW
                (and update VNA in IWR)
            else
- continue end if

- store DWR into Data Memory at address = VNA end do end

FIG. 6. Pseudocode representation of the action of the Navigation Engine.

Navigation Engine:

*Find and read a node data-word* begin get selected node-number from DAP
    read IW from Index Memory at NC = node-number
    read DW at corresponding VNA into DWR-N end

FIG. 7. Pseudocode representation of the action of the Evolution Engine.

Evolution Engine:

*Add, Delete or Modify a node* begin get selected node-number from DAP
        get evolution *condition* (add new node, delete node, modify node) from DAP branch on *condition*

| | | |
|---|---|---|
| • | Add node: | - call Instantiation procedure for NC = node-number<br>- call Population procedure for same node,<br>    according to parameters specified by DAP<br>- exit |
| • | Delete node: | - call Instantiation procedure (delete mode) for NC = node-number<br>- update NFI and release space in data memory via PMC<br>- exit |
| • | Modify node: | - call Navigation procedure for NC = node-number<br>- modify fields in DWR-P as specified by DAP<br>- call Population procedure for NC = node-number<br>- exit | end branch end

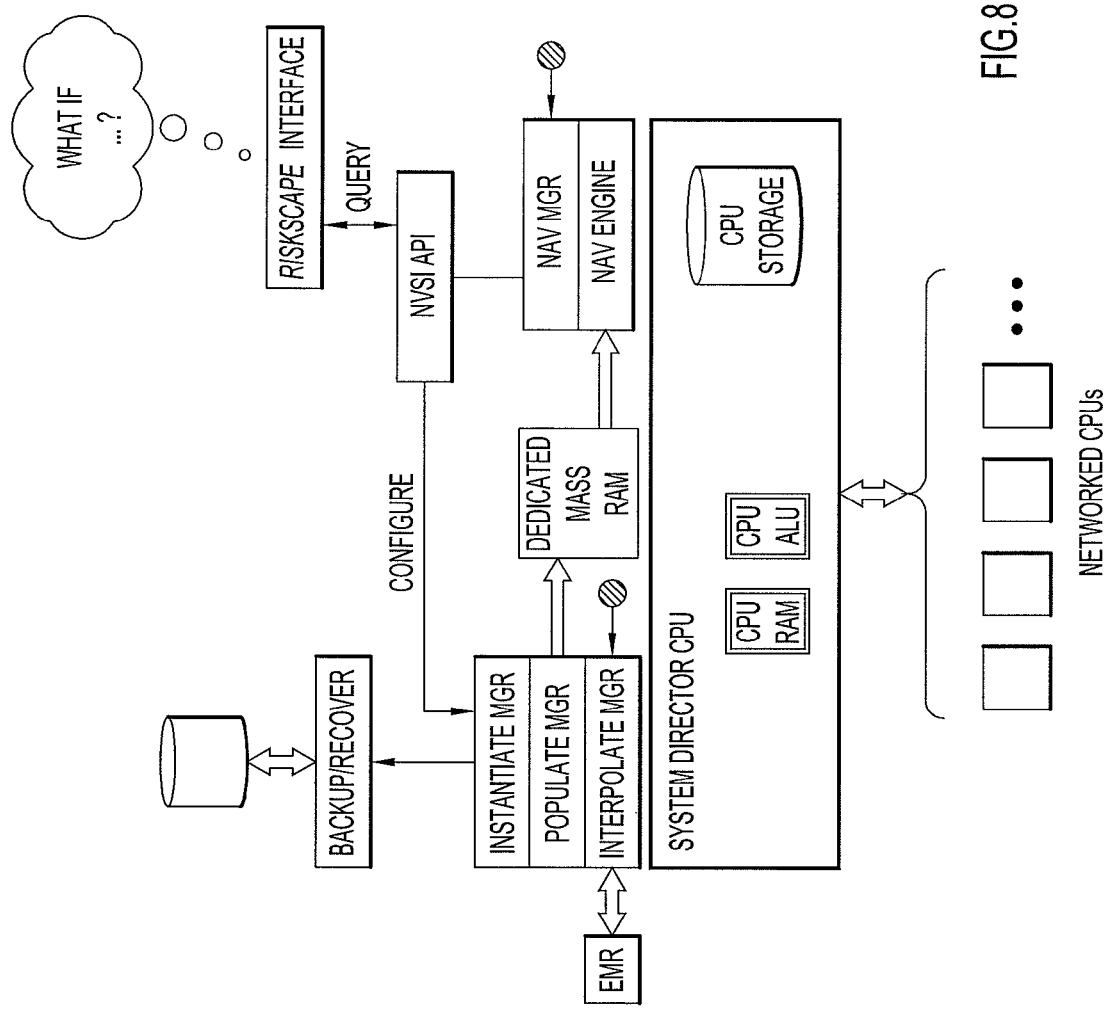

VIRTUAL SUPERCOMPUTER

CROSS-REFERENCE TO RELATED APPLICATIONS

This application is a Continuation of U.S. patent application Ser. No. 10/821,582, entitled "Virtual Supercomputer", and filed Apr. 9, 2004, which claims priority to the provisional application:
   Virtual Supercomputer
   Application No. 60/461,535 Filing Date Apr. 9, 2003
   Inventors Gary. C. Berkowitz & Charles C. Wurtz
   The above-mentioned applications are incorporated herein by reference in their entireties.
   This application incorporates by reference, in whole, as a partial embodiment of some of the elements of the virtual supercomputer, the prior filed co-pending application:
   Knowledge-based e-catalog procurement system and method
   application Ser. No. 10/215,109 Filing Date Aug. 8, 2002
   Inventors G. C. Berkowitz, D. Serebrennikov, B. M. Roe, C. C. Wurtz

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Technical Field of Endeavor

The present invention is generally directed to the field of computing and more specifically to the field of information processing, and even more specifically, to the field of high-demand, high-performance, and supercomputing.

2. Description of the Related Art

The ability to use computers to process extremely complex or large amounts of stored information and derive new useful information from that information previously stored has assumed an important role in many organizations. The computer-aided methods used to store and derive information vary, but the vast majority of such methods depend on a general purpose computing hardware architecture. Accordingly, the potential to craft an optimal solution to a computing problem is limited by a static hardware architecture that is optimized not for any specific computing task, but rather to provide an acceptable level of processing ability over a wide and disparate range of computing tasks.

Attempts to create optimal solutions to solve specific and complex information processing tasks have focused on creating hardware architectures designed to exploit various features of the information to be processed so that such processing can be performed in an optimal manner. Hardware devices containing specialized vector processing units are one such example. Software written for such hardware formats the information into a form that takes advantage of the hardware's specialization, thus creating a computing environment that is tailored to the specific problem at hand. Such tailored solutions are usually implemented on high-end supercomputing hardware architectures with specialized software. Consequently, this approach is prohibitively expensive for most organizations, often costing millions of dollars. Additionally, once created, tailored solutions of this type are only suitable for a specific problem or class of problems.

The software written to solve specific high-performance computing problems is necessarily constrained by the features of the hardware upon which such software runs. When such software is in machine-readable form, it is tightly coupled to a specific architecture upon which it will run. Further, the underlying hardware machine architecture is almost always static, and only reconfigurable (and only partially so) in a few non-commercial machines not widely available. Even the so-called grid (or network or large-cluster) computing approaches, which rely on large numbers of interconnected physical or virtual machines, are still constrained by running on a few different types of conventional processors. While the topology of the network can be configurable in such approaches, the architecture of the underlying processors is static, and thus not tailored to the problem at hand.

The concept of a virtual supercomputer addresses these shortcomings. The virtual supercomputer provides a conceptual, reconfigurable hardware architecture for high-performance machine-readable software. The conceptual hardware architecture masks the actual underlying hardware from the machine-readable software, and exposes to the software a virtual machine reconfigurable for the problem at hand. The virtual supercomputer thus provides to the software the operations needed for optimal processing, unconstrained by the overhead associated with those hardware operations of the underlying machine that are not relevant to the task. This not only speeds the computing required for the problem, but also importantly, it dramatically speeds the process of software application development, as the developer can write program code to a machine that directly processes operations specifically optimized for the problem to be solved.

The virtual supercomputer translates the software instructions from the format for the virtual machine into a format that a particular underlying hardware architecture can process. Each specific hardware architecture must have a specific virtual machine associated with it. Thus, software for the virtual supercomputer can run on a wide variety of hardware architectures, because the virtual machine for each specific hardware architecture provides the same conceptual hardware architecture for software developers. Therefore, a large investment in a supercomputer or supercomputing cluster, with attendant maintenance and obsolescence issues, is avoided. Further, unlike a grid or conventional network computing system, which increases power in a brute-force manner by simply adding more processors, each virtual machine in a virtual supercomputer network has an internally configurable architecture, thus magnifying the power of the virtual supercomputer to provide a tailored solution.

One embodiment of some portions of the virtual supercomputer is described in the pending application Knowledge-based e-catalog procurement system and method, listed in the CROSS-REFERENCE section of this application.

BRIEF SUMMARY OF THE INVENTION

The present invention solves the previously mentioned disadvantages as well as others. In accordance with the teachings of the present invention, a computer-implemented method, apparatus and system is provided for crafting high-performance information processing solutions that are able to be tailored to specific problems or classes of problems in a way that such tailored solutions will perform on a variety of hardware architectures while retaining the benefits of a tailored solution that is designed to exploit the specific information processing features and demands of the problem at hand.

The present invention provides a reconfigurable virtual machine environment upon which a tailored solution to a specific problem (including a class of problems) is crafted. Additionally, an operating system for such a virtual machine is included. The information to be processed for a problem is encoded into a solution-space, or manifold of nodes, where a node can be any kind of data structure, and the nodes may be independent (point clouds), or connected in any kind of topology, such as an acyclic directed graph (ACG) structure, a balanced tree, or other suitable data representation. This data representation is specifically constructed to closely match the architecture of the problem to be solved and the information to be processed. By exploring the data representation, the information comprising the problem is processed, and various possible solutions to the problem are generated and evaluated. The identified solution is not necessarily the optimal solution to the problem, but is sufficiently accurate and robust to be useful. The exploration of the data representation is performed in a controlled manner to locate a solution.

In one embodiment of the present invention, the virtual supercomputer operates on a single hardware processor and provides a software environment in which tailored solutions to multiple problems and/or problem classes can be created. In another embodiment of the present invention, the virtual supercomputer operates on a distributed interconnected network of hardware processors. Such processors may or may not be all of the same type. In this second embodiment, the advantages of additional computing resources and concurrent processing can be exploited to find a solution in a highly efficient manner.

BRIEF DESCRIPTION OF THE DRAWINGS

Throughout, a synonym sometimes used for the present invention (virtual supercomputer) is the acronym NVSI (Netcentric Virtual Supercomputing Infrastructure).

FIG. 1 is a block diagram depicting the overall architecture of an embodiment of the virtual supercomputer system.

FIG. 2 is a block diagram depicting the virtual machine's major components and their interconnection.

FIG. 3 is a pseudocode representation of the Configuration Engine.

FIG. 4 is a pseudocode representation of the Instantiation Engine.

FIG. 5 is a pseudocode representation of the Population Engine.

FIG. 6 is a pseudocode representation of the Navigation Engine.

FIG. 7 is a pseudocode representation of the Evolution Engine.

FIG. 8 is a functional block diagram of the NVSI system.

DETAILED DESCRIPTION OF THE INVENTION

Figure 9:
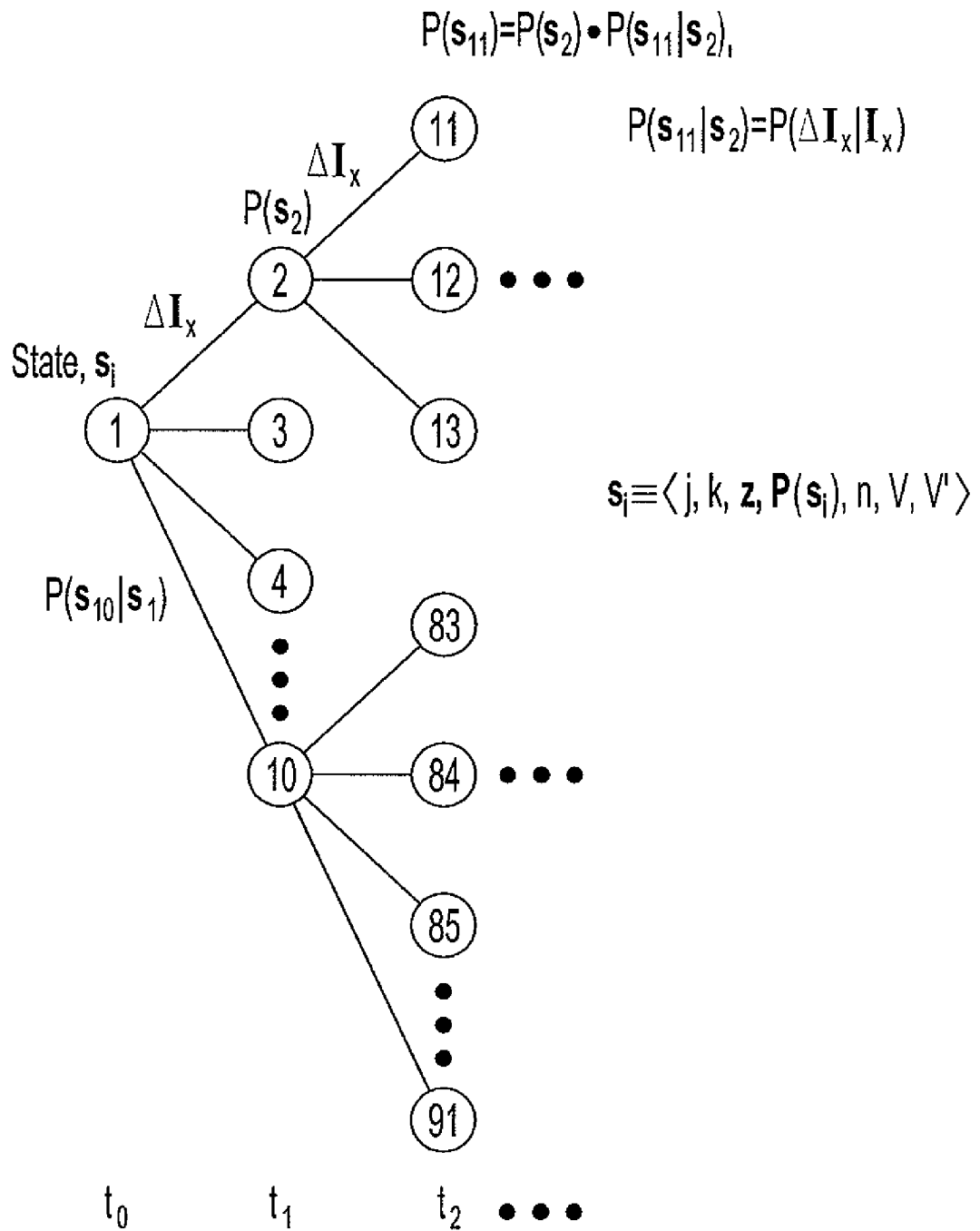
FIG. 9 is an example tree fragment.

The accompanying drawings, which are incorporated in and form part of the specification, illustrate an embodiment of the present invention and, together with the detailed description, serve to explain the principles of the invention.

In a preferred embodiment of the present invention, shown in FIG. 1, the virtual supercomputer is a system, apparatus and method, composed of the NVSI Virtual Machine (VM), which is the actual reconfigurable virtual hardware processor, an associated operating system (NVSI-OS), a virtual-machine assembler (NVCL Assembler), an application programming interface (NVSI-API), Platform Drivers, and a Platform Assembler.

A problem domain-specific application requests specific processing tasks be performed for it by the virtual operating system running on the NVSI virtual machine (VM). These processing requests take the form of function calls that are defined by the virtual supercomputer's application programming interface (API). The architecture does allow for an embodiment in which direct calls to the VM are made by the Domain Application.

The virtual operating system (NVSI-OS) is composed of multiple layers containing a plurality of sub-components. The uppermost layer contains the OS managers. The managers coordinate various aspects of the creation of the solution space and the operation of the virtual supercomputer. Managers manage various engines and can invoke the operation of any set of engines to accomplish a task. The next layer contains engines, daemons, and a toolbox. The engines implement low-level machine instructions to send to the virtual machine and generate code that will activate the virtual machine. Daemons are background processes responsible for such tasks as reconfiguring the data representation, garbage collection, and memory recapture. An example would be pruning of unused or outdated branches in a tree manifold by the navigation engine (see below). The toolbox is a collection of routines that are frequently called by the managers. To accomplish certain frequently preformed tasks, a manager has the option of issuing an instruction to an engine or instead making a call to the toolbox.

The solution space is the collection of nodes or other data formats that are interconnected in such a way as to construct a data representation, or manifold, with input data encoded into its topology. One possible embodiment for such a data representation is an acyclic directed graph. Other possible embodiments include, but are not limited to: independent point-clouds, ordered sets of points, cyclic graphs, balanced trees, recombining graphs, meshes, lattices and various hybrids or combinations of such representations. Each node represents one point in the data representation that is implemented using a data structure. The topology of the data representation is determined by the interconnections among the data structures. A node contains data in various forms, depending on the particular problem to be solved. Choices from among possible data representations are made based upon the attributes of the particular problem to be solved. Data contained in a node can be in the forms of numeric tags, character tags, boolean flags, numeric values, character values, objects IDs, database-record IDs, simple arrays, variable-density multidimensional arrays, symbolic functions, mathematical functions, connection pointers to other nodes, function pointers, lookup-table list pointers, linked-lists, or even pointers to other solution spaces or data representations.

The instantiation engine (IE) provides instructions for the instantiation unit (IU) that creates and deletes nodes (the IU and other machine units are shown in FIG. 2). The population engine (PE) provides instructions for the population unit (PU) that stores data into nodes, and the arithmetic and logic unit (ALU) that emulates a more traditional hardware-implemented ALU. The navigation engine (NE) provides instructions for the navigation unit that reads selected nodes. The evolution engine (EE) provides instructions for updating the contents of the IU and the PU. The configuration engine (CE) provides instructions for the solution-space configuration unit (SCU), which allocates memory for the data nodes and the node index. The SCU also stores configuration parameters for every aspect of the architecture.

The configuration engine (CE) modifies a data representation(s) to create a topology tailored to the problem at hand. When creating this topology, the CE chooses from among a plurality of available topologies and modifies a chosen topology or topologies to suit the given problem. The CE then stores the chosen data representation parameters, and hardware configuration parameters, into the SCU.

The virtual operating system, including its component parts, interacts with the VM via the virtual assembler. The virtual assembler is analogous to a conventional assembler or compiler in that it converts function calls written in a high-level programming language into commands that the machine can understand and process. In this case, the commands are in a format the virtual machine can process.

The NVSI virtual machine (VM) interacts with the platform drivers. The platform drivers allow the virtual machine to interact with the operating system resident on the host computer. The platform drivers interact with one or more underlying hardware platform CPUs via a platform assembler, which converts commands from virtual machine-level function calls to commands that the platform-specific operating system and hardware can understand and process.

The virtual operating system has the ability to create multiple threads to perform tasks concurrently. When a new thread is created, a new virtual central processing unit (VCPU) is created along with the thread. Newly created VCPUs are not complete copies of the entire virtual machine. VCPUs contain only the components necessary for their respective processing tasks, such as the IU, PU, and NU. Certain components of the VM, such as the index memory, data memory, the configuration unit, and the network control unit (comprising the backbone 'core' of a CPU), are not typically duplicated in threads. The resources and services provided by such components are shared among the other components of the virtual supercomputer.

A functional block diagram of the components and interconnections within the virtual machine (NVSI Virtual Machine, as denoted by the bold-bordered box in FIG. 1, is shown in FIG. 2.

The Solution-space Configuration Unit (SCU) contains the index base register (IBR) stack, the index-memory allocation and data-memory allocation registers (IMAR, DMAR), the node data-structure definition register (DDR), the data definition array (DDA) memory, the field type (FT) table, the number of nodes register (NNR), the data definition count register (DDCR), and the parameter configuration register (PCR). The SCU is where the configuration structures of the virtual machine are stored. The PCR contains information that defines various attributes of the virtual machine by defining the structure of the data words used. This configuration can be altered by users or an application program at startup, or even during runtime execution.

The IBR stack is a set of IBRs that provides an indexed addressing system for memory access. Each virtual register stores a base address that specifies a boundary for a segment of the virtual supercomputer's memory space. Offsets may be calculated by taking this base address value and adding to it the value from the virtual node address (VNA) field of the node index word (IW) stored.

The DDA is a table of data-structure definition words (DDW), each identified by a unique integer data definition number (DDN). When a 'store data definition word' instruction is executed, if the DDN indicates that the DDW is new, the word is written into an available free memory location in the DDA. If the DDN indicates the word is not new, the previous version of the DDW is overwritten with the new version. The DDW to write into the table is located in the DDR.

The FT table in the SCU stores a list of preset data word field types, such as tag, flag, character, integer, fixed-point, floating-point, function pointer, node pointer, and list pointer. This table defines the valid field types that may be contained in a DDW (and may be extended via settings in the PCR).

The NNR is a virtual register that stores the current count of non-null nodes. It assists in the numbering and creation of new nodes as such nodes are instantiated, and serves effectively as a measure of the size of the solution space.

The DDCR is a virtual register contained within the SCU that contains the total count of active data definitions. This information is used for DDA operations.

The PCR stores the basic parameters that define all configurable (and thus alterable) elements of the virtual supercomputer CPU. Such configurable elements include maximum field lengths, maximum register lengths, the number of registers in a stack, or the sizes of arrays and tables.

The Instantiation Unit (IU) creates the nodes and makes space for the nodes in the data representation. The IU contains one node index word (IW) in the node index word register (IWR). The IW contains a null flag that is set when a delete instruction is executed for a specified node. The next field contains the DDN. Following the DDN is a field that specifies the length of the data word. Next is the VNA, followed finally by an application-defined field (ADF). The ADF can be used for special purposes defined by the specific application.

The node-counter (NC) register is a virtual register containing a pointer to the next node. The NC contains a node number that is a non-negative integer specifying the relative address of the corresponding IW in the node index memory (NIM).

The Population Unit (PU) contains a node data word (DW) stored in a virtual register labeled the node data-word register (DWR-P). A DW may be fixed length or variable length. A fixed length flag indicates the type of a particular DW. The DW stored in the PU is used when populating the solution space (Node Data Memory, NDM) with nodes. The PU evaluates the data structure for a given node. The results of such evaluation are stored into a data word whose location in the NDM is pointed to by the index word. Every data word has a unique address in the NDM that is the VNA.

The navigation unit (NU), like the PU, contains a node data word (DW) stored in a virtual register labeled the node data word register (DWR-N). This value is used when navigating through the solution space.

The node index memory (NIM) contains the node free index (NFI) and the next free node registers (NFNR1 & 2). The NFI stores the current intervals of free nodes in the node index space. The NFNRs are loaded from the NFI, and store the beginning and the end of a range of free nodes. The primary use of the NFNRs is during instantiation operations where unused node index words are overwritten.

The arithmetic and logic unit (ALU) is a software implementation of some functions that are often implemented in hardware. It contains an adder/multiplier, a logic evaluator, an arithmetic register (AR) stack, a lookup table index, a function index, and an ALU memory. It allows as well for 'pass-though' of arithmetic operations to the underlying hardware CPU.

The physical memory controller (PMC) operates between the NIM and the NDM. The PMC controls the use of physical memory devices such as random access memory (RAM), disk drives, optical storage drives, and other physical memory devices which may be available to store data.

The network control unit (NCU) handles the low-level details of sending out data and processes to be processed. It in turn is controlled by a network manager. These two units handle the tasks of separating tasks to be run concurrently, load balancing, and other network and concurrency-related management tasks.

The CE store configuration parameters in the PCR, and also creates and stores data definition words (DDWs) in a manner depicted by the pseudocode in FIG. 3. The engine begins by entering a loop. This loop executes once for each of a specified number of data-word architectures in the domain solution space modeled within the data representation. Within each iteration of the loop, the CE creates a DDW in register DDR according to the parameters specified by the domain application program. The CE next stores the DDR into the DDA in the configuration unit. The CE then continues its processing by executing the next iteration of the loop. The CE finishes its execution when it has executed the loop the specified number of times.

The IE creates nodes in a manner depicted by the pseudocode in FIG. 4. The engine begins by entering a loop. This loop executes once for each of a specified number of nodes to be created in the domain solution space modeled within the data representation. Within each iteration of the loop, the IE creates an IW in register IWR in the IU. The IE next stores the IWR into index memory at a node number indicated by the node counter. The IE then allocates space in data memory at a virtual node address (VNA) calculated by the IM internal memory manager based upon parameters in the corresponding DDW word. The IE then continues its processing by executing the next iteration of the loop. The IE finishes its execution when it has executed the loop the specified number of times.

The population engine (PE) evaluates and stores nodes in a manner depicted by the pseudocode in FIG. 5. The PE begins by entering a loop. This loop executes once for each of a number of nodes. The PE reads an IW from index memory (NIM) at the specified node address. The PE next reads the DDW pointed to by the DDN in the IW. The PE then evaluates all fields in the data word according to the corresponding DDW. The PE then creates a data word in the data word register (DWR-P) in the population unit. If the length of the data word has changed, then the internal memory manager computes a new VNA, stores the new VNA into the corresponding IW and updates the VNA in the IWR, and stores the DWR-P into data memory (NDM) at the new VNA. If the length of the data word has not changed, the PE stores the DWR-P into data memory at the old VNA.

The navigation engine (NE) finds and reads a node data word in a manner depicted by the pseudocode in FIG. 6. The NE gets the selected node number from the domain application program. The NE then reads the IW from index memory at the position specified by the node counter. The NE reads the data word at the corresponding VNA into the DWR-N.

The evolution engine (EE) adds, deletes, or modifies nodes in a manner depicted by the pseudocode in FIG. 7. The EE begins execution by getting a selected node number from the domain application program. The EE then gets the evolution condition from the domain application program. The evolution condition specifies whether the EE is to add a new node, delete an existing node, or modify an existing node. If the condition specifies that the EE is to add a new node, the EE calls the instantiation procedure for the specified node number. The EE then calls the population procedure for the same node according to parameters specified by the domain application program. If the condition specifies that the EE is to delete an existing node, the EE calls the instantiation procedure in delete mode for the specified node, and updates the NFI. If the condition specifies that the EE is to modify an existing node, the EE calls the navigation procedure for the specified node number. The EE next modifies fields in the DWR-P as specified by the domain application program. The EE then calls the population procedure for the specified node number. When the activities required by the given condition are completed, the EE completes its execution.

Further details regarding this invention are described below.

NVSI (Netcentric Virtual Supercomputing Infrastructure) is a technology that provides a software solution for a broad range of computationally demanding problems—in a myriad of commercial domains—that would normally require a dedicated supercomputer or large-scale, special-purpose, 'one-off' software. The core of NVSI is a system architecture that blends key ideas in computing, some rather novel, and some imported and modified from discrete mathematics, analog and digital computing theory, high-performance computing, and hardware supercomputers. The most unique aspect of NVSI is the design philosophy, derived from a biological perspective, in which analogs of evolution and growth provide computational structures and representations that are dynamic, flexible, adaptive, and work "well enough" under the constraints of imperfect and incomplete information.

As analogy, the human brain is not the ideal solution that a computer engineer would construct from scratch. The brain is, in effect, a hodge-podge of accumulated structures and algorithms that includes the biological equivalent of dead, buggy, bloated, contradictory, redundant, expensive, unstructured, inelegant, non-optimal and apparently useless code, and yet it solves an enormous range of changing situational problems. It doesn't always, or even usually, provide perfect results in an ideal sense, but the brain does yield workable and often novel moment-to-moment solutions that accomplish the task at hand.

Fundamentally, NVSI is a substrate that embeds biological notions in a system architecture, a virtual machine enabling construction of high-performance applications that provide superior solutions to certain classes of problems arising in a variety of industries. In particular, NVSI creates a common computing foundation that applies to widely disparate domains, where the shared theme is the rapid response to complex and fluid user demands not requiring the real-time analysis of a massive flood of streaming data, and for which the solutions may be imprecise and incomplete, but sufficiently accurate and robust to relieve the burden on brute-force processing, and to dramatically enhance the responsiveness of the system.

Some typical domains of application include:
  financial risk-analysis & portfolio valuation
  e-commerce procurement & catalog management
  customer, vendor and peer-to-peer knowledge capture
  telecommunications call-routing
  high-demand query caching
  customized global media distribution, and
  fraud detection.

1. NVSI Features

The innovations of NVSI, beyond the leading one of creating a virtual supercomputer in software, include the merging of existing high-performance computing techniques and designs with the employment of novel approaches to computation, such as the separation of pre-computation from navigation to dramatically reduce real-time overhead, biologically-inspired "good enough" solutions, and the use of evolving data structures and adaptive computational architecture. In particular, key aspects of NVSI are:

matching problem architecture—NVSI is designed at every level to enable the architecture of the data space to reflect, or 'map', the architecture of the problem domain. This allows for the most efficient solution to the problem.

adaptable solution manifold—Flexible connectivity in data-structures allows for the optimal hyperspatial topology (or a mosaic of topologies)—selected from a spectrum of representations (such as point-clouds, graphs, trees, lattices, and hypercubes)—that are most relevant to a specified problem domain. Further, the manifold may adapt in a variety of ways, including value interpolation, function extrapolation, and tree elaboration.

fast application creation—The NVSI virtual machine is a unified computational substrate, including not only the virtual "hardware", but a collection of dedicated engines (configuration, instantiation, population, navigation, evolution), managers (network, thread, data-distribution, multiprocessing), and toolbox functions, which together allow for rapid development of new applications in different domains, as the structure of the problem changes, without having to build a new special-purpose architecture from scratch.

evolving structure—The approach is organic, as NVSI dynamically alters its data-structures and solution-space (manifold) architecture and topology, and even reconfigures its processor design, in response to on-going changes and demands in the problem space. That is, NVSI enables applications to accumulate, select or extinguish the adaptations it makes to variation in both the content and the character of the data. Thus, both the virtual machine, and the domain applications, evolve. And while a few commercial supercomputer designs employ reconfigurable computing, they are necessarily limited by realization in hardware, whereas NVSI, being a virtual machine in software, provides nearly unbounded reconfigurability without the burden of acquiring an expensive and exotic mainframe.

optimized calculation—Highly-optimized function evaluation, fixed-point integer arithmetic, application-selectable precision, and various other numerical techniques provide for ultra-fast, 'accurate enough' computation.

supercomputer techniques—Software emulation of high-performance computing structures and processes (such as a small instruction set, simple and efficient data representation and handling, inherent vector representation, limited data/calculation modes, interleaved memory, table lookup, induced pointers, and distributed & parallelized computation) provide a powerful machine and cost-effective scaling and enhancement.

pre-compute & navigate—Separation of processes into pre-computation (populating the state-space) and interactive navigation (searching, modifying and selecting the resulting hyperspace of results) allows for near-real-time response, despite highly complex and computationally-intensive data manifolds.

autonomous dæmons—Second-order dedicated processes operate in background, as concurrent tasks, to collect garbage, prune trees, condense redundancies, process edit-queues, interpolate with finer granularity (mesh enhancement) around selected nodes in state-space, or to extrapolate and elaborate the data structures, during both population and navigation phases.

integrated multiprocessing—In addition to its embedded netcentric design optimized for distributed processing, the NVSI virtual machine provides for inherent parallelism as multiple program threads generate multiple CPU clones, an approach not possible with a hardware machine.

2. Design Overview

Why NVSI?

NVSI is a virtual computer, composed of an operating system and a quasi-general-purpose, reconfigurable, multiprocessing, network-based, asynchronous RISC machine, that happens to be created in software only, and is designed to provide high performance over a large class of specific business-computing problems. NVSI can be implemented on a mosaic of platforms, and an increase in power of the underlying physical CPUs simply enhances the overall performance of the system.

One may ask: how can a layer of software be more powerful than writing code directly to the underlying physical platforms? The answer, of course, is that fundamentally, it can not. However, by acting, essentially, as an alternative computing architecture, NVSI is designed to expose to the system developer a landscape of primitive (that is, elementary) operations essential to the kinds of problems for which the features of NVSI are optimum. Thus, applications can be quickly developed for the relevant domains, without a business having to employ extensive labor resources to create a special-purpose, dedicated 'one-off' solution at enormous cost. Further, the internal NVSI operations use as few and the fastest platform-CPU instructions as possible, thus maximizing performance and avoiding the 'bloat' and wasted power inherent in general-purpose microprocessors. And last, NVSI bypasses the platform OS and makes direct calls to the platform CPU, thus eliminating one software layer that applications would typically be forced to use.

The result is that NVSI squeezes maximum performance out of the underlying CPUs, while providing to the developer a set of operations optimally suited to the problem at hand. With computational power proportional not only to speed and storage, but also to utility, and inversely proportional to capital and human resources consumed, NVSI outperforms both hardware supercomputers and custom vertical applications in power per dollar, when applied to the problems for which it is designed.

NVSI Architecture

As in any computer, there are CPUs that include functional units, memory stores, and dedicated registers, all of which execute machine-instructions coded by system programmers. The core of the NVSI System is composed of the NVSI Virtual Machine (VM, the 'hardware') and the NVSI Operating System (OS). The NVSI-OS is an integrated collection of managers, engines and Toolbox macros, all written in an NVSI control language (NVCL), which is assembly-like and makes direct calls to the virtual hardware.

A typical system configuration for an NVSI installation is shown in FIG. 1, which illustrates one NVSI System installed on one physical machine (server platform). The actual NVSI processor (VM) is shown in more detail in the functional block diagram of FIG. 2.

Terminology

Solution Space—the collection of points, or nodes, in a state-space representing the entire landscape of data structures that is allocated (instantiated), computed (populated), explored (navigated) and modified (evolved). The atomic element of the solution space is a node, which represents a point in the solution space to which is attached a set of data structures. The way in which nodes are connected (or not) determines the topology of the solution space (sometimes termed a manifold), and this topology, together with the associated node data-structures, implements a "map" of the problem domain. A spectrum of basic topologies for the solution space is briefly described below.

Node—the elemental entity in a solution space. Each node is represented by two parts: an Index Word (IW) that corresponds to the node-number, and includes a pointer to the associated Data Word (DW), which is the second part that comprises a node. For some applications, an Index Word can serve as the Data Word as well, in which case, a node is then represented by only Index Words that also contain some data fields. The DW is an array of fields that can be of various data-structure types, including numeric or character tags, boolean flags, numeric or character values, arrays, connection pointers (to other nodes), function pointers, lookup-table list pointers, linked-lists, or even pointers to entire other manifolds. There can be many different kinds of data structures in a solution space, and each distinct data-word architecture is defined and stored in the Solution-Space Configuration Unit (SCU, see below).

Unit—a functional component of the VM that performs a specific category of operations on nodes. Some typical operations are: configuring (and reconfiguring) the NVSI architecture for the problem domain; allocating & configuring the index and data spaces; creating, deleting, & populating (evaluating) nodes; navigating (exploring) the node data-space (solution space, or manifold); modifying (evolving) nodes and/or connections; performing optimized arithmetic, getting lookup-table values for common mathematical operations, and generating function values; and distributing data and/or tasks over a network.

Register—an internal part of a Unit, used to transfer data between memory and NVCL variables. The configuration of each register corresponds to an associated memory word, and is thus implicitly composed of sequential fields of specifiable length. Each field in a register is ultimately bound one-to-one to a specific, persistent variable—appropriately named to reflect the field description—in the relevant engine (NVCL) program. However, an important design aspect of the VM 'hardware' is that, to maintain the utility (that is, fastest possible performance) of loading a register in a real machine— which is a parallel operation and thus takes only one hardware cycle—the actual transfer of contents between registers and Index/Data Memory is done as a single binary encoding of the entire word. That is, when NVSI is running in 'compact' mode, only bit-strings are loaded into, and from, Index and Data registers, and are stored into or read from Index and Data memory words. Thus, a register is loaded from external operands by first encoding the field-variables into binary, and then compacting the bits into a single register-operand. Conversely, to extract the individual fields into NVCL bound-variables, the register contents are assigned to a whole-register variable in NVCL, and this bit-string is then parsed by the program code into the corresponding variables. The VM can also be run in 'non-compact' mode—typically for creating application prototypes—in which registers and memory words are simply stored as mixed-type arrays of fields, and thus no binary encoding/extraction is performed. Of course, this severely degrades performance (in both space and time), but it does allow for an easier development process.

The functional units of the VM are all dedicated to manipulating nodes: their data architecture and their connection topology. Each unit is controlled directly by the corresponding engine(s) in the OS, which send instructions to the unit. The NVSI-OS is both netcentric and multitasking, and thus machine programs can not only be sent to multiple VM-CPUs, but can also execute in each of the functional units of a CPU separately, in tandem.

VM Unit Descriptions

The units and their basic functions follow. For reference, the NVSI Register & Memory-Word Specifications are shown below, and the NVSI Machine Instruction Set is shown in Table 1 (both are discussed in more detail in later sections).

Solution-Space Configuration Unit (SCU)
    The SCU specifies all of the elements that determine the architecture of the virtual machine, including: the amount of memory allocated for the index and data spaces, the register and field configuration parameters (in the PCR), the array of data-definition words (DDA) that define the architecture of both index and data words & registers, the table of field types, the size of the ALU stack, and the memory segment-addressing registers. The SCU also stores a dynamic count of the number of nodes instantiated (NNR), and the number of data-word definitions currently active (DDCR). The SCU gets instructions from the Configuration Engine.

Instantiation Unit (IU)
    The IU creates and deletes nodes. A node is created by storing a node Index Word (IW) into the Index Memory (IM)—at a location given by the Node Counter (NC)—with the contents of the Index Word Register (IWR). The IW contains a flag indicating the 'null' (free, available for assignment) status of the node, a pointer to the data-definition word (DDW) for the node, a pointer to the virtual-node-address (VNA) of the node data-word (DW), and one or more application-definable fields (ADF). Space for the DW is reserved in the Data Memory (DM) at a location given by the VNA, based upon the length specified by the DDW. The actual physical memory location is maintained by the Physical Memory Controller (PMC) unit.
    The IU gets instructions from the Instantiation Engine and the Evolution Engine.

Population Unit (PU)
    The PU stores data into nodes. That is, it fills and/or computes the value of all fields of the node DW—in the manner specified by its DDW—with the data contained in the PU Data Word Register (DWR-P). The address of the DW is the VNA contained in the corresponding IW(NC). Any functions called for by the node DDW (that are to be computed during population) are evaluated and the result stored in the corresponding DW fields. The PU gets instructions from the Population Engine and the Evolution Engine.

Node-Counter Register Unit (NC)
    The NC holds the node-number, an integer that points to a word in the node Index Memory (IM), with the pointer-value an integer in the range [0: maxNodeNum]. The NC is used by the IU, PU and the Navigation Unit to select the node to operate upon. The NC may get instructions from the Instantiation, Population, Navigation and Evolution engines.

Navigation Unit (NU)
    The NU reads a selected node. Given the node number (in the NC), the data-word (DW) is read from the data-memory—at the VNA in the corresponding index word—and loaded into a register (DWR-N) in the NU. If the node specification requires navigation-time evaluation of functions, this is performed by the Navigation Engine program after the data word is read.
        Typical navigation often involves moving among connected nodes. This is accomplished by reading a DW, extracting the node-number pointer from the relevant data field, executing an instruction to set the NC to that value, and then executing a 'read' again.
    The NU gets instructions from the Navigation Engine.

Index Memory (IM)
    This is a fast, random-access, shared memory store that contains the node index table, which is an array of index-words for the entire data space. The index-word (IW) address is the node number, which is taken from the NC (or the NNR). The computation of the VNA for the data-word (DW) is handled internally (and automatically) by the data-memory-manager (DMM) when a node is created (via the IU), using the contents of the NC and the corresponding DDW. The VNA is output to the Physical Memory Controller (PMC) unit, which handles the actual storage of the associated DW. If a population operation causes the size of a (variable-length) data-word to change, the DMM finds the next available VNA, then updates the VNA field of the corresponding IW, and it also triggers a reload of the IW register in the IU (to reflect the new VNA).
        The IM also contains the Node-Free Index (NFI), which is simply a memory-list of all currently available (free) node-number ranges. The IM internal controller maintains the NFI, updating it for every create-node or delete-node operation. In response to a get-free-node-range instruction, the IM controller loads the inclusive bounds of the next (i.e., at or beyond the value of the NC) free-node range into the NFNR1 & NFNR2 registers. This operation is the only significant piece of 'firmware' (that is, embedded microcode program) in the VM (except for some ALU routines).
        In a multiprocessing environment, the IM controller also handles the memory sharing. For high-performance applications, the IM is physically located in one platform RAM, although it can, in fact, be spread across networked resources.

Data Memory (DM)
    This is the unit that implements the data manifold. It is a fast, random-access, shared memory store that contains the entire collection of node data-words. The separation of index from data allows the DM to be maximally compact. Indeed, for hypercube-type data spaces, the geometry of the manifold is explicitly stored in the Index. The DM is a virtual memory that is implemented physically over possibly many networked machine RAMs and/or hard-storage devices. The physical node address (PNA) is taken from the PMC unit. In a multiprocessing environment, the DM internal memory-manager also handles the memory sharing. Typically, in all but the smaller domain applications, the DM will be spread across networked hard-storage resources. To maintain optimum performance, the data memory is compacted and stored sequentially in the most efficient manner possible (such as disk-striping).

Arithmetic & Logic Unit (ALU)

The ALU is a 'firmware' emulation of a typical ALU, but of more utility is the built-in support for fixed-length representation of real numbers in one-byte increments, and the use of look-up tables for common mathematical functions, to allow for fast, moderate-accuracy computation. The ALU also stores application-defined functions (such as pointer-induction computation) for access by other units (notably the PU and the NU). As the underlying platform-CPU may be quite powerful arithmetically, thus negating any advantage of the NVSI ALU for standard arithmetic operations, a set of instruction flags (operands) allow for pass-thru of any or all operations to the platform ALU. The NVSI ALU gets instructions from the Population Engine and, for secondary processing where necessary, the Navigation Engine.

Physical Memory Controller (PMC)

The PMC handles the conversion of virtual to real memory addresses, for both RAM and hard storage.

Network Control Unit (NCU)

The NCU handles the distribution of both data and task processes for the network. It gets instructions from the Network Manager.

NVSI Multiprocessing

Multiprocessing is Built Into the NVSI Architecture on Several Levels:

There can be one or more NVSI Virtual Machines installed on a given platform (although at most one platform is dedicated to one VM; that is, to conserve performance, a VM is almost never spread over separate physical machines). More typically, a set of machines, each with an NVSI-VM installed, can be networked to provide either for concurrent execution of different applications, or, more powerfully, for the magnified power inherent in multiple machines processing over the same application domain. A network of cooperating VMs is termed an NVSI Cluster.

The NVSI-OS is multi-tasking, so that in a given VM, separate threads may be created and execute concurrently (this is, of course, pseudo-multitasking unless the physical platform—the installation machine—is a true multiprocessor). As each unit in the VM may execute code separately and concurrently, there is no central control unit to act as a bottleneck, which otherwise happens in a conventional Von Neumann machine.

For each OS thread, a separate, temporary NVSI VM-CPU may be spawned, or replicated. The core of the VM (the central 'spine' of FIG. 2) contains the global, non-replicating elements (SCU, IM, DM, PMC, NCU) of the machine (one core per VM installation). A replicable virtual CPU (which may be partial) is thus composed of one or more of the following units: IU, NC, PU, NU, & ALU. Local data is modifiable, but all virtual CPUs must negotiate with the SCU and memory units for access to shared information. Note that, implicit within each global unit is the ability to create and manage multiple input data paths, and multiple output buses, to accommodate the multiple virtual-CPUs created by each thread. A partial CPU allows for the creation of simply one or two Units for a thread, as needed.

The PMC & NCU, controlled by the Network Manager, allow for distributed processing and data-distribution across a heterogeneous network of platforms. This is the more conventional use of networked resources.

OS Engine Descriptions

The various engines are low-level modules in the NVSI-OS that generate the actual machine code sent to and executed by the Units of the VM. Thus, the Instantiation Engine, for example, runs procedures to create nodes, the Population Engine procedures fill (evaluate & store) nodes, and so forth. Calls to the engines are made from the OS managers (or perhaps the application directly) as tasks, such as "Instantiate 500 nodes", with associated parameters passed to the engines. Some typical engine procedures are shown in FIGS. 3-7.

The Toolbox is simply a collection of generic engine programs that have wide utility, both for low-level OS tasks, and application-level functions that are generic across domains. The Toolbox enlarges as experience with various application domains yields engine code that is used repeatedly.

Daemons are autonomous programs used for concurrent, dedicated processes that operate in the background to collect garbage, prune trees, condense redundancies, process edit-queues, etc.

Manager Descriptions

While the Engines implement various tasks, the NVSI-OS Managers coordinate among tasks. These include network, thread, data-distribution, & multiprocessing managers, as well as engine managers that handle the coordination of all the different tasks for a particular engine, in a higher-level manner accessible to the NVSI API.

3. Writing NVSI Programs with NVCL

NVSI Control Language (NVCL) is the assembly-level language composed of two coding schemes:

a Virtual Machine Language (VML) that maps one-to-one from the machine instructions (Table 1) to actions by the VM 'hardware' units, and an embedding language (EL) that handles the flow of control (there are no branch or halt instructions in the NVSI instruction set).

OS engine and/or manager programs are written in NVCL. In subsequent versions of NVSI, there may be provisions for each unit to maintain its own program counter, and thus its own flow-of-control.

A typical engine program in NVCL has the following structure:

```
Start
EL code
    :
    VML code
    :
    EL code        ⎫
        VML code   ⎬  EL structure  ⎫
    EL code        ⎭                ⎬  Embedding
    :                               ⎬  Language Control
EL code                             ⎭  Structure
End
```

NVCL Examples

For all example code-fragments, the Embedding Language (EL) is a form of pseudo-code, in which boldface indicates a keyword, italic denotes a variable name, and underline indicates a named constant. For virtual-machine instructions (shown in monotype), operands appear in sequence after the operation, separated by spaces. 'True' values are coded as '1', 'False' as '0'. A 'null' value codes a non-operative variable or operand.

Virtual Machine: Register and Memory-Word Specifications
All Word/Register Configurations are Illustrated as Follows:

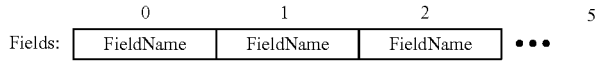

Field numbering begins with left-zero, and is not shown except where necessary to avoid ambiguity. Underlined field names indicate fields that also specify field-type or length in the same or another register. If a field is enclosed in square brackets [ . . . ], it is an optional part of a word or register, contingent upon parameters stored in another register or memory word. Field names shown in the text are delimited by angle brackets < . . . >.

Field format: Boolean (bln)|integer (int)|character (char)
These are the primary formats for word/register content. There are, however, many field meanings, or types, such as floating-point, pointer, etc, that further define the field content, and are specifiable by <TypeNum> fields in a Data Definition Word (DDW). The list of available types is maintained in the Field-Type Table (FTT). The int format may be decimal or binary, and the char may be typographic or binary ASCII, depending on a parameter (compact mode) in the Parameter Configuration Register (PCR), or unless noted otherwise.

Field length: n, the number of places—bits or bytes, depending on mode.
Unless noted otherwise, n is shown in bits. If the length is derived from a parameter stored elsewhere (usually in a definition word or in the PCR register), then it is shown as either len<parameter>, or len(<parameter>) if len=log$_2$(parameter).

Node Counter Register (NC)

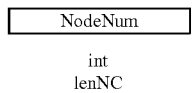

int
lenNC

The NC is the node-pointer. Its contents are the node-number NodeNum, an integer that is also the relative address (starting at zero) of the corresponding node Index Word (IW) in the Index Memory (IM). Thus, $0 \leq NodeNum \leq \Omega$, $\Omega$=maximum number of nodes=maxNodeNum.

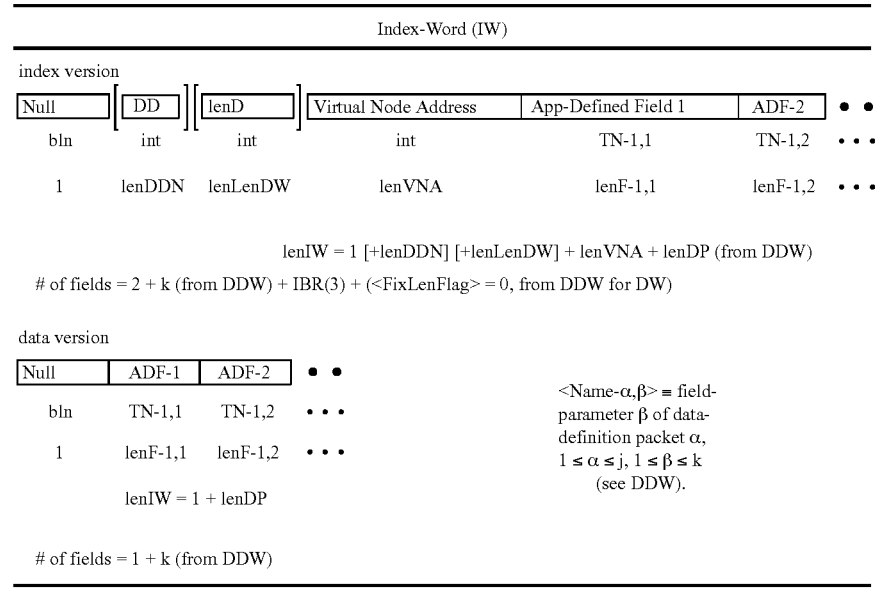

The IW typically functions as the index (index version) for an associated data word (DW), but the IW can be used as an indexed data-word itself (data version), for optimal performance where the data structures are fixed-length and simple.

An IW is always fixed-length, and all words in a memory segment are the same length. This allows for RAM-like storage and retrieval of index words. The address of each IW is its node-number (NodeNum).

The <Null Flag> is set only via a DEL instruction. It is redundant, as the null status of any node can be extracted from the Node-Free Index (NFI), but the flag provides faster access to null status at minimal storage penalty.

The optional <DDN> field specifies the data-definition number for the associated data word. It exits if the <DDN-D Flag> of the corresponding Index Base-address Register (IBR) is 1, indicating that the data-definition number is specified in the IW instead of by the <DDN-D> field of the IBR.

The optional <lenDW> field defines the length (in bytes) of the associated data-word (and DW register) for the index version of the IW. It exists if the data-word is variable length, as specified by a 0 value in the <FixLenFlag> field of the data-definition for the data word (available from the DDR register in the SCU). Otherwise, the length is specified in the DDW.

The composition of the Application-Defined Fields in the IW is contained in the corresponding Data-Definition Word (DDW), which is specified in the relevant IBR for the index-memory segment that includes the given IW (addressed by node-number). The DDW is selected by its Data-Definition Number (DDN), and the default DDW that specifies all index-words is DDN 1.

There are a fixed number of ADFs for both versions of the IW, and all fields are fixed-length. Thus, for a DDW that specifies the configuration of an index word, there is only one definition-packet (DefPak—see DDW word, below).

Index-Word Register (IWR)

| NodeNu | Index Word |
|---|---|
| int | mixed |
| lenNC | lenIW |

The IWR holds the contents of one index word, to be either stored into or read from the IW pointed to by NC. The <NodeNum> field is valid only after a read operation, and serves as a memory-address register to retain the last node-number accessed.

In 'compact' mode, the contents are loaded as one binary super-field (operand), either as read from memory, or as constructed from concatenating and encoding all component operands of the embedding-language variables into one bit-string. The parsing of the index-word after a read is done at the engine level, using the specifications contained in the corresponding DDW.

addressing of array words is handled internally by the SCU.

When a DDN is specified (>1) in a data-definition loaded into the DDR, and a store-data-definition instruction is executed, the internal controller checks to see if the DDN is new. If so, the DDW is written over a null array word (an unused, or available, memory word, indicated by DDN=0). If the specified DDN is not new, the existing DDW word with the same DDN is overwritten by the contents of the DDR.

The <FixLenFlag> specifies that the entire data-portion (DP) of the definition is fixed-length, and the length is then contained in the <lenDP> field. Although this information could be derived from real-time extraction of the relevant fields in the definition word, these two fields provide fast access for fixed-length configurations. If the DDW applies to an Index-Word (IW)—which are, by definition, fixed-length—then the <FixLenFlag> field is ignored.

If <FixLenFlag> is 0 (variable-length), then the length of each data-word is computed during instantiation or population, and stored in the <lenDW> field of its corresponding IW.

The details of the data-definition are contained in some number j (from the <NumDefPaks> field) of definition packet (DefPak) meta-fields, which are collections of field-specifications for each packet. If the DDW applies to an Index-Word, there is only one DefPak.

---

Data-Definition Word (DDW) & Register (DDR)

| DD | FixLenFl | lenD | NumDefPaks (=j) | DefPak-1 | DefPak-2 | • • | DefPak-j |
|---|---|---|---|---|---|---|---|
| int | bln | int | int | mixed | mixed | • • • | mixed |
| lenDDN | 1 | lenLenDW | len(max j) | lenPak-1 | lenPak-2 | • • • | lenPak-j |

$$\text{lenDDW} = 1 + \text{lenDDN} + \text{lenLenDW} + \text{len(max } j) + \sum_j \text{lenPak-}i$$

$\left.\begin{array}{c}\vdots\\\vdots\end{array}\right\}$ NumDD  (for DD Array)

DefPak:

| FNF | NumFlds | FL | AS | lenFl | lenF-1 | • • • | lenF-k | AS | TypeNu | TN- | • • • | TN- |
|---|---|---|---|---|---|---|---|---|---|---|---|---|
| bln | int | bln | bln | int | int | | int | bln | int | int | | int |
| 1 | len(max k) | 1 | 1 | lenLenDfld | lenLenDfld | | lenLenDfld | 1 | lenTNum | lenTNum | | lenTNum |

$$\text{lenPak} = 4 + \text{len(max } k) + \text{FNF} \cdot \{\text{FLF} \cdot \text{lenLenDfld} \cdot [1 + (k-1) \cdot \text{ASL'}] + \text{lenTNum} \cdot [1 + (k-1) \cdot \text{AST'}]\} + \text{FNF'} \cdot \{\text{FLF} \cdot \text{ASL} \cdot \text{lenLenDfld} + \text{lenTNum} \cdot \text{AST}\}$$

---

A DDW specifies in detail the architecture of any data words, and/or the data-portion of the index words. The selector is the Data Definition Number <DDN>. The DDN is not a relative address into the array, it is merely an application-defined integer label (although it is unique). This allows for particular DDNs to be retained for corresponding DDWs, without the need for reassignment and/or word-swapping in the array. The actual Each DefPak specifies whether or not there a fixed number of fields (<FNF>=1), and if so, the number (k) of fields is given by <NumFlds>. If all the fields in the packet are fixed-length (<FLF>=1), then the length is given by the <lenF-k> fields. And if all the fields are the same length (<ASL>=1), then the length is given by just the one <lenFld> field. If the number of fields in the packet is variable (<FNF>=0), then the field lengths are stored in each data-word. Note that if the global FixLenFlag=1, then all <FNF> and <FLF> fields are taken to be 1.

Similarly, the data-field types are given by the <TN-k> fields, where field type includes: tag, flag, character, integer, fixed-point, floating-point, function-pointer, node-pointer, and list-pointer (the table of data types is stored in the Field-Type Table in the SCU). And if all the fields are the same type (<AST>=1), then the type is given by just the one <TypeNum> field. The case where the number of fields is variable (<FNF>=0) and the fields are not all the same type, is not allowed, as this would force the storage of field types in the data word, which is a complexity not part of NVSI version 1.0.

have all fields of the same type, is forbidden in version 1.0 of NVSI, as it would require the storing of field types in the data-word as well. This level of complexity may be supported in subsequent versions.

Data-Word Registers (DWR-P & N)

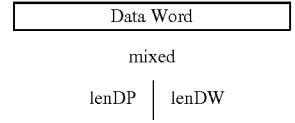

Data-Word (DW)

1) FixLenFlag 1:

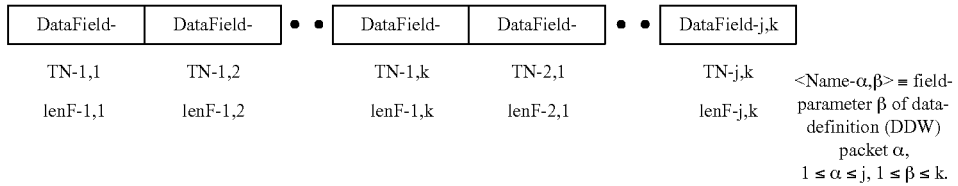

2) FNF 0, FLF 1, for some packet i (1 ≤ i ≤ j):

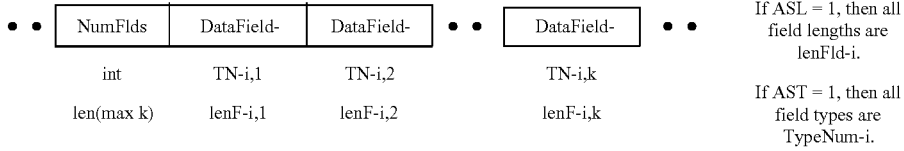

3) FNF 1, FLF 0 for some packet i:

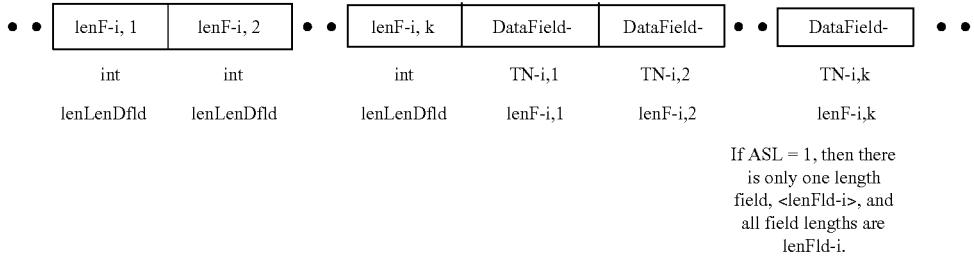

4) FNF 0, FLF 0 for some packet i:

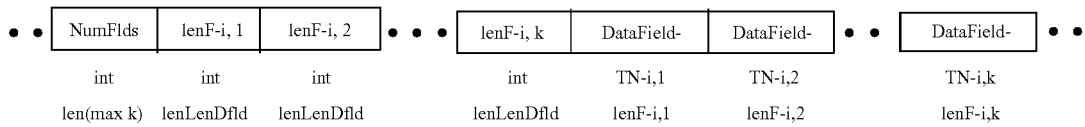

Data words come in one four basic configurations, depending on whether the data-definition specifies:
1) fixed-length word
2) variable-length word, due to variable number of fields in some part
3) variable-length word, with fixed number of fields but variable field lengths
4) variable length word, with both variable number of fields and variable field lengths.

Note that in the latter three, the number of fields and/or the field-lengths must be stored in the actual data word. Note also that the condition where a variable number of fields in some part (packet) of the data-definition also does not The Data-Word registers (one in the PU and one in the NU) hold the contents of one data-word, to be stored into (DWR-P) or read from (DWR-N) a data-word in the DM (at the VNA specified in the associated IW). In 'compact' mode, the contents are loaded as one binary superfield (operand), either as read from memory, or as constructed from concatenating and encoding all component operands of the embedding-language variables into one bit-string. The parsing of the data-word after a read is done at the engine level, using the specifications contained in the corresponding DDW. The length of the register is specified either by the DDW (if the fdata-word is fixed-length), or the associated IW (if variable length).

Number of Nodes Register (NNR)

| NumNod |
|--------|
| int    |
| lenNC  |

The NNR holds the current total count (=NumNodes) of non-null nodes. This is used for iterating node-creation and population operations, and also for display by the NVSI Console Monitor.

Data-Definition Count Register (DDCR)

| NumDD  |
|--------|
| int    |
| lenDDN |

The DDCR holds the total count (=NumDD) of active data-definitions. This is used for DDA operations, and by the NVSI Console Monitor.

Node Free Index (NFI)

| boundary | NodeNu | boundary | NodeNu | • • |
|----------|--------|----------|--------|-----|
| bln      | int    |          |        |     |
| 2        | lenNC  |          |        |     |

The NFI stores the current intervals (inclusive range) of free (available, or 'null') nodes in the node Index Memory. Although a one-bit boundary flag is strictly sufficient to distinguish between a single node entry (for isolated free nodes), and an interval that requires two node-numbers to specify, a two-bit flag is used to provide for error-recovery in the event of a system crash, so that the NFI can be reconstructed. The <boundary flag> indicates one of three conditions that apply to the subsequent <NodeNum> field: single-node, node-interval-start, or node-interval-end. Thus, for example, the following would specify that the next free nodes are 17, and then 23-28:
  ⋯ 11 17 01 23 10 28 ⋯,
where 11 indicates an isolated free node to follow, 01 indicates the start of a range, and 10 indicates the end of a range.

Next Free Node Registers (NFNR 1 & 2)

| NodeNu |
|--------|
| int    |
| lenNC  |

NFNR1 & 2 are loaded—via the Get-Free-Node-Range instruction—from the Node-Free Index (NFI). Their primary use is for garbage collection, and for subsequent instantiation operations, to allow overwriting of unused Index words. The GFNR instruction is the only operation in the VM that invokes a significant sequence of embedded microcode, which searches the NFI for the first node-number greater than or equal to the value of the NC, and then loads the NFNR1 with that number, and NFNR2 with the end number of the range.

Field-Type Register (FTR) and Table (FTT)

| TypeNum       | Data-Word Field |
|---------------|-----------------|
| int           | char            |
| len(NumTypes) | lenTypeName     |
| ⋮             | ⋮               |
|               | NumTypes        |

The FTT is a firmware table in the SCU that stores the list of preset data-word field types (tag, flag, character, integer, fixed-point, floating-point, function-pointer, node-pointer, and list-pointer). The FTR is a register in the SCU that is used to hold FTT words for storage or retrieval.

The FTT is extendible via SCU instructions from the Configuration Engine.

Index-segment Base-address Registers (IBR) and Stack

| NodeNu | DDN-I  | I/D Flag | DDN-D | DDN-D  |
|--------|--------|----------|-------|--------|
| int    | int    | bln      | bln   | int    |
| lenNC  | lenDDN | 1        | 1     | lenDDN |
|        |        | ⋮        |       |        |
|        |        | NumIBR   |       |        |

To provide for the segmenting of the solution-space into portions that share identical index and/or data-word configurations, but are distinct from other portions, the VM supports a simple indexed-addressing mechanism. Each IBR stores a base index address (node-number) that delineates the lower boundary of an index-memory segment that has common index-word definitions. Thus, any node whose address is greater than or equal to <NodeNum>, and is less than the node-number field of the next IBR, has the same configuration. The configuration of all the index words in the segment is given by the DDW pointed to by <DDN-I>.

The IBR stack consists of a set of NumIBR index base registers. If, at any point in the stack, the next IBR has a null <NodeNum> field, then the upper bound of the previous segment is taken to be maxNodeNum (that is, the end of Index Memory).

The <I/D Flag> determines whether (1) or not (0) the index words in that segment serve also as data-words. If so, then the subsequent fields in the IBR are ignored. If not, then all of the data words may share the same configuration (<DDN-D Flag>=0), which is then described by the DDW pointed to by <DDN-D>. This allows for matching homogeneous index and data segments. Otherwise (<DDN-D Flag>=1), the data-definition pointer for each data-word is stored in its respective index word (in the <DDN> field).

The IBR stack is loaded via the set-index-base-register instruction to the SCU.

Arithmetic Stack Register (AR)

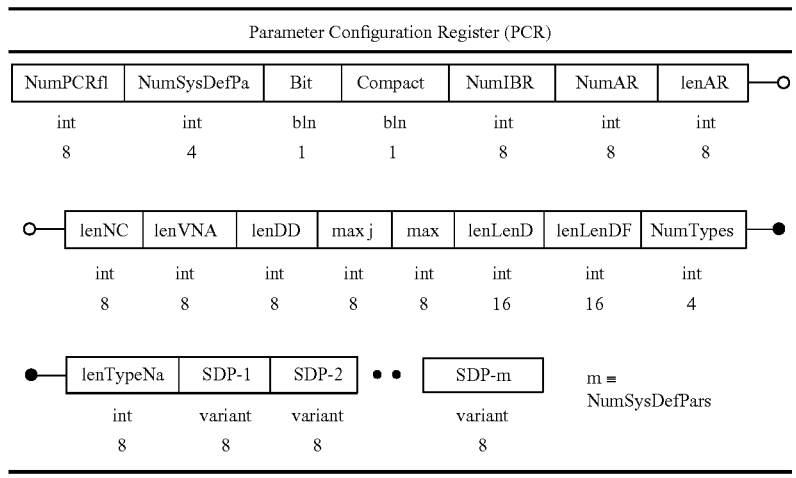

The PCR stores the basic parameters that specify all the configurable architectural elements of the VM. These include the operating modes, field and register lengths (bit widths) for various components, and the number of registers or memory-words in the various configurable stacks, tables, and arrays.

TABLE 1

Virtual Machine Language (VML) Instruction Set

| VM Unit | Mnemonic | Operation | Operands | Opnd Type | Description |
|---|---|---|---|---|---|
| NC | SET | set NC | opnd.NC1 | integer | Set NC to <opnd.NC1>. |
|  | INC | increment NC | [opnd.NC2] | integer | Increment NC by one or <opnd.NC2>. |
|  | DEC | decrement NC | [opnd.NC2] | integer | Decrement NC by one or <opnd.NC2>. |
| SCU | LPCR | load PCR | opnd.CU1 (n) | integer-array | Set each field in the PCR to its corresponding element in the integer-array <opnd.CU1>. The dimension n of CU1 is the number of fields in the PCR, given by <opnd.CU1(0)>→ PCR(0) = NumPCRflds. |
|  | LMA | load (set) IM & DM allocation registers | opnd.CU2 (2) | integer-array | Set the IMA register to the amount of memory, in megabytes, to be allocated to index-memory, as given by <opnd.CU2(0)>, and set the DMA register to the amount of memory allocation for data-memory, as given by <opnd.CU2(1)>. |
|  | LDDR | load DDR | opnd.CU3 (n) | variant-array | Set each field in the DDR to its corresponding element in the variant-array <opnd.CU3>. The dimension n of CU3 is available from the configuration details of the data definition. If n = 1 (one element), then the single operand field is loaded into DDR(0) to specify the DDN for a subsequent read (GDDW) instruction. |
|  | SDDW | Store DDA word | [opnd.CU4] | boolean | Store (write to) each field in the DDA memory-word pointed to by DDN = DDR(0) with its corresponding field value in the DDR. If the DDN is new (not found in the DDA), then increment DDCR. If <opnd.CU4> = True, then the |

TABLE 1-continued

Virtual Machine Language (VML) Instruction Set

| VM Unit | Mnemonic | Operation | Operands | Opnd Type | Description |
|---|---|---|---|---|---|
| | | | | | instruction becomes a delete, and the DDN of the corresponding DDA word is set to zero (which flags the word as null), and the DDCR is then decremented. |
| | GDDW | get (read) DDA word | — | — | Set each field in the DDR to the corresponding field in the DDA word pointed to by DDN = DDR(0). |
| | CDDA | clear DDA | — | — | Set the DDN field of all DDA words (count given by DDCR) to zero. Set DDCR to zero. This happens by default at "power-up" (initialization). |
| | SFT | store Field Type word | opnd.CU5 (2) | variant-array | Load the FTR from <opnd.CU5>, then execute a store into FTT word pointed to by FTR(0) = CU5(0) = TypeNum. If <opnd.CU5> is a single element, then only FTR(0) is loaded, and no store is executed, in preparation for a subsequent read (GFT) instruction. |
| | GFT | get (read) FT word | — | — | Load the FTR from the FTT word pointed to by FTR(0) = TypeNum. |
| | SIBR | set an IB Register | opnd.CU6 opnd.CU7 (5) | integer variant-array | Set all fields of IBR(i), where i = <opnd.CU6>, to <opnd.CU7>. |
| IU | RIW | read IW | — | — | Set IWR to IW(NC). This allows the reading of IW contents, primarily as a precursor to navigating, populating or re-instantiating a node. |
| | LIWR | load IWR | opnd.I1 (n) | variant-array | If the VM is operating in 'compact mode', then the single (n = 1) operand bit-string is loaded into the IWR (Index Word portion). Otherwise, the fields of the IWR, as defined (prior) by the configuration of the DDW pointed to by the DDN-I field of the relevant IBR (based upon NC), are loaded from the corresponding operand-array elements. The length of the IWR, and the number of fields (the dimension n of the operand array), are calculated prior to this instruction, from details contained in the associated DDW. This instruction is typically a precursor to executing a CRE instruction. |
| | CRE | create node (store IW) | [opnd.I2] | boolean | [If <opnd.I2> = True, then create (instantiate) a node at node-number = NNR, else create node at node-number = NC (default). To create a node, the contents of the IWR (except the Null Flag), are stored as an IW in Index Memory at relative address = node-number. In 'compact mode', this is a simple binary transfer. Otherwise, the fields of the IWR are stored into corresponding IW-array elements. The NC is then incremented (to optimize serial instantiation). If the node had been null, then clear the Null Flag of the IW, update the NFI, and increment NNR. Note that if the IW is a data version, then the ADFs may be null, to be filled later via a PDW instruction. |
| | DEL | delete node | — | — | Delete node (set Null Flag) in IW at node-number = NC. Also, if node had not been null, then update NFI, and decrement NNR. |
| | GFNR | get free node range | — | — | Sets NFNR1 & NFNR2 to the boundaries of the next-free-node-range, where NFNR1 ≧ NC. (The internal IM controller scans the NFI, and finds the first null node or node-range ≧ NC. This instruction is therefore slower, as it |

TABLE 1-continued

Virtual Machine Language (VML) Instruction Set

| VM Unit | Mnemonic | Operation | Operands | Opnd Type | Description |
|---|---|---|---|---|---|
| PU | LDWR | load DWR | opnd.P1 (n) | variant-array | executes an embedded microcode procedure.) If the VM is operating in 'compact mode', then the single (n = 1) operand bit-string is loaded into DWR-P. Otherwise, the fields of DWR-P, as defined (prior) by the configuration of the DDW pointed to by either the DDN-D field of the relevant IBR (based upon NC), or by the DDN of the associated IW, are loaded from the corresponding operand-array elements. The length of the DWR, and the number of fields (the dimension n of the operand array), are calculated prior to this instruction, from details contained in the associated DDW. |
|  | PDW | populate (store) DW | [opnd.P2] [opnd.P3] | boolean boolean | If <opnd.P2> = True, the IW is a data-version and the contents of DWR-P are stored into the data portion of the IW located at address = NC. Otherwise (index version), store the contents of DWR-P into the DW located at: if <opnd.P3> = False (pre-execution address retrieval), then VNA ← IWR(VNA); else (execution-time address retrieval), VNA ← IW(NC). Note that if the length of the DW has changed, then a new VNA must be obtained by the DM internal controller (in conjunction with the PMC), which then automatically rewrites the new VNA into the corresponding field of both the IW, and the IWR In 'compact mode', the store operation is a simple binary transfer. Otherwise, the fields of the DWR are stored into corresponding DW (or IW) array elements. The NC is then incremented (to optimize serial population). |
| NU | GDW | get (read) DW | [opnd.N1] | boolean | Load DWR-N with the contents of the DW at the VNA selected by <opnd.N1>, same action as for <opnd.P3>. GDW is the basic navigation operation. | key
[ ] optional operand
< > operand name in text
≡ 'is defined as'

The following description advances and details the concept of implementing a novel software architecture on a heterogeneous network of conventional computational platforms to create a Netcentric Virtual Supercomputer Infrastructure (NVSI). In order to provide a full appreciation for the commercial importance of this breakthrough enabling technology, the description also describes one possible application of the NVSI, named RiskScape. The RiskScape application addresses a particular computationally-intensive problem in financial risk management known as Portfolio Stress-Testing.

We begin by discussing why this technology represents a breakthrough, and we then enumerate the several innovations that we have brought to bear in order to achieve this breakthrough. We next discuss the nature of how NVSI accomplishes its radical level of performance without special-purpose hardware. We then review the reasons why we believe no one has heretofore taken this approach to computer system design.

The description continues with a mathematical treatment of the RiskScape design in order to demonstrate the power of the NVSI technology. In this section we outline the assumptions we have made to make the problem computationally tractable, as well as discuss several of the optimization techniques that the NVSI platform provides to the application developer.

Finally we make a comparison of the NVSI technology with hardware-based supercomputers. This comparison addresses both the classes of problems to which NVSI is suited, as well as a discussion of those to which it is not. The last comparison is in price/performance. Here we show the estimated computational throughput of the NVSI system in terms of VFLOPS (Virtual Floating-point Operations per Second), and compare this with two CRAY RESEARCH machines, the T90 and the T3E.

Our findings conclude that for certain classes of problems for which pre-computation is a viable methodology, the NVSI/RiskScape solution is capable of about 250 (Virtual) GigaFLOPS. This performance is comparable to that of the CRAY T3E. Most importantly from a commercial perspective, we estimate that the cost of an NVSI/RiskScape implementation will be on the order of 50 to 100 times less than a comparable hardware-based solution.

Executive Overview

Netcentric computing is the new paradigm for building efficient, cost effective computer systems to solve numerous business problems. Many commercial enterprises have invested substantial sums in computer hardware only to discover that they realize a fraction of the total CPU power. This is because the operating costs of a piece of hardware are identical whether the machine is running at its peak capacity, or sitting idle. The problem is compounded by the fact that while one machine is sitting idle, another in the same office is so overloaded that it has slowed to a crawl. What is needed is a way to allow the power of idle, or underutilized, machines to automatically augment the capacity of those that are over burdened. Such a solution would allow businesses to add hardware in an incremental fashion, rather than having to continuously upgrade expensive servers and mainframes.

This description describes a breakthrough, software-based enabling technology that transforms a network of conventional PCs, workstations and servers into a virtual supercomputer designed for optimal performance over a wide class of commercial domains. Quite general in nature, this virtual supercomputer can be used to solve many (although certainly not all) computationally intensive problems that are found in a number of different businesses. These include telecommunications switching, investment-portfolio valuation, e*commerce order processing, high-demand query caching, and fraud detection, to name a few.

So that our proposed technology does not begin life as a solution in search of a problem, we have applied virtual supercomputing to the problem of Financial Risk Management. Specifically, we have addressed Portfolio Stress-Testing an area that has a significant need for a cost-effective solution, and for which our new technology is well suited.

However, it must be appreciated from the outset that while we describe a specific application, this should in no way imply that the underlying technology is limited to this application. Our sole purpose in blending the description of the risk management application with the enabling technology in this paper is to demonstrate the vast cost/performance benefit.

RiskScape: An Application of Netcentric Supercomputing to a Business Problem

It is clear that many commercial problems, such as Financial Risk Management, need the level of computational power associated with conventional hardware-based supercomputers. Unfortunately, unlike mission-critical projects for military and government operations, the commercial world is highly constrained by economic considerations. In the main, businesses cannot justify the expenditure of tens, if not hundreds, of millions of dollars on computer hardware that will become obsolete in three to five years. This is true even though rapid and accurate risk management can spell the difference between business success and catastrophic failure.

What is needed for commerce is a viable solution that transforms the substantial hardware investment already made by a firm into a computational platform capable of supporting the necessary time-critical decision process. In this description, we outline our design for such a computer system (termed Netcentric Virtual Supercomputer Infrastructure or NVSI), and then continue to describe one commercial application (RiskScape) that together can provide the level of performance financial institutions require in order to manage their risk.

Our current best estimate of the sustained "Virtual FLoating-point OPerations per Second" (VFLOPS) obtainable by our risk-management application supported by our proposed NVSI technology, is between 5 and 250 GigaFLOP (billion floating-point operations per second), depending on the number of CPUs available to the system. This meets the computational power of a CRAY RESEARCH T3E, the highest-end commercially available supercomputer.

This translates as the ability to evaluate a portfolio consisting of one million instruments (including portfolios of derivatives on both debt and equity instruments) across three million scenarios in under one hour.

It is important to note that the solution we propose is software based, and requires only an incremental amount of additional hardware. From an economic and commercial standpoint we estimate that a full NVSI/RiskScape implementation will be between 5 and 10 million dollars. A hardware-based solution with comparable performance would cost in excess of 50 to 100 million. Moreover, unlike a hardware solution, the NVSI system will not become obsolete with advances in computer technology. Indeed, performance only improves with evolution in platform and network capability.

Computing portfolio risk (PR) is a problem taking center stage in investment risk management. Managing risk is not trivial. Banks and other financial institutions are in the business of taking risks to generate increased revenues and profits, but they are also required to protect shareholder value and prevent catastrophic losses from occurring. To date, evaluation of PR has mostly been confined to macroscopic aggregate measures such as Value-at-Risk (VaR), which estimates PR as an expected loss derived from a weighted sum of volatilities in the individual securities in the portfolio, based on small, statistically-derived market moves. Current risk management systems thus do an effective job of characterizing the expected loss in linear portfolios operating in normal markets. Indeed, some form of full Monte Carlo VaR is the state-of-the-art for both market and credit risk measurement.

Yet, VaR indicates only the maximum expected loss that could occur over some time interval (the portfolio holding period) within some confidence level (usually $2\sigma$ or standard deviations, about 97.5%). VaR has nothing to say about discontinuous or extreme ($3\sigma+$) market events, such as the Russian Sovereign Debt, and Japanese and Emerging Market currency crises. That is, VaR ignores the "fat tails" in the distribution of portfolio values within which lurk the "dragons" of risk, the unexpected large moves in financial variables that can cause substantial losses, as have been suffered by a number of leading financial institutions over the last several years (such as LTCM). And given that the financial markets are not normally distributed (they are log-normal), such events happen with considerable—and distressing—regularity. To cover the possibility of extreme events, financial institutions implement large safety factors, as the absence of specific risk data for the "tails" induces great caution. The result is that excess capital is lying dormant, an inefficient solution at best. Moreover, if the VaR method is pushed to achieve a greater range of application, severe computational limitations arise. Finally, even setting this consideration aside, VaR calculations still do not really address the "What if?" scenario questions.

In light of these limitations, the method of stress-testing has evolved as a complement to VaR. Also known as scenario analysis, this approach attempts to address the weaknesses in VaR by subjectively generating scenarios that simulate large-variance events. This enables the handling of nonlinear positions, and certainly fills in some of the gaps. But, current implementations of stress-testing are flawed because of the small number of scenarios that can be examined (due to computational constraints), thus forcing necessarily subjective choices about which extreme changes to evaluate. The method also considers movements in only one, or few variables, and correlations are virtually ignored. And most glaring of all the defects in current stress-analysis of PR is the inability to forecast path-dependent scenarios several time-steps into the future, again due to limits on computational resources.

Even if the appropriate predictive tools existed (such as comprehensive scenario-analysis systems that accessed rich historical data combined with "mark-to-future" states), the sheer data problem is enormous. Further, the integrity of the data is crucial for assuring the validity and integrity of the risk management process results. Real issues of analytical model fidelity and accuracy compound these challenges. New financial products are finding their way to market (credit derivatives, synthetic financial products, etc.) at an accelerating pace. As the worlds of market risk and credit risk begin to merge, there is an accelerating pace in transaction volume growth. It is increasingly clear that the standard approaches to managing risk are not keeping pace with the problem domain. The approach to problem solving in the risk management marketplace today is gated by problems of computing power; database transaction processing throughput, application design, application scalability, and user interface technology.

Of course, this is not news. It is well known that the ideal approach would be to simulate the detailed price trajectory for all the instruments in a portfolio, over a broad range of path-dependent scenarios, using the best (perhaps several) pricing models available (or Monte Carlo simulation, finite-difference methods, numerical integration, or tree expansion, where closed-form models do not exist), all calibrated by accumulations of historical data to provide correlation coefficients, scaling factors, and transition-probabilities for variations in financial parameters. The difficulty has been that such an approach requires an enormous amount of computing power (on the order of leading-edge supercomputers), at a cost that is daunting to even the most resource-rich investment banks. So, we settle for VaR, and a lot of theoretical modeling and projection. But, risk analysis must be essentially data-driven, not a theory-driven exercise performed in a data vacuum.

This description outlines a new technology that allows, for the first time, a practical solution to the problem of calculating future risk for large-scale portfolios. We present a novel computing architecture—essentially a software-based "virtual supercomputer"—that supports on-demand access to projected prices over portfolios of O(1M) securities, for a full range of path-dependent scenarios that entail large (3σ+) moves in financial variables. Termed NVSI (Netcentric Virtual Supercomputer Infrastructure), the system is a suite of highly-optimized system kernels and user applications, designed to emulate the key aspects of supercomputer architecture (tools, techniques, and algorithms), running on off-the-shelf workstation and network hardware, for about $\frac{1}{100}^{th}$ the overall cost of a dedicated supercomputing system.

How does it work? In brief, by continuous off-line (background) computing, the RiskScape/NVSI constructs a daily updated landscape of projected portfolio values for a broad range of scenarios, along with associated scenario probabilities. This multidimensional state-space (hyperspace) can then be queried to yield near-real-time answers to questions such as: which scenarios (if any) could result in catastrophic loss to my portfolio in a week, ninety days, and six months out, and with what likelihood?

By using supercomputing techniques emulated in software, model optimization, massive non-swappable RAM, and distributed processing over commercial networks of existing workstations, the NVSI first populates a hyperspace of up to 10 billion nodes with state-vectors that contain the pricing information (and other moments) for the entire range of instruments in a portfolio of up to 10 million securities. Once the hyperspace is fully populated with pricing vectors, the portfolio can then be marked to any future state (scenario) desired, simply by looking up (or navigating to) the address of that state and applying the pricing vectors to each instrument. The computational overhead of this second phase is minimal, as the vectors have been pre-computed off-line. Clearly, the combinatoric nature of the problem requires that the solution space be properly constrained. To do this correctly, the optimal granularity and distribution of the state-vectors in the hyperspace must be determined to ensure that the problem domain is fully bracketed.

If the set of state-vectors is chosen appropriately, the entire landscape of scenarios can be searched for the extreme events. In fact, the application can be programmed to find the boundary conditions for catastrophic loss. In other words, the NVSI system can actively search future state-space to determine what combination of market and/or credit conditions would cause the portfolio (or institution) to fail. In addition, the probability of these conditions obtaining, and the likely amount of time required for the conditions to obtain as well as the transition states through which the world must pass to reach the final state, can be determined.

Such information would allow strategic management to see problematic conditions in advance, and take appropriate action. Problematic financial and non-financial holdings can be analyzed, understood and unwound before potential financial meltdowns occur.

Why hasn't this been done before? The answer is, because the computing demand is enormous, the price/performance ratio for available technology has just recently come within practical range, and no one has heretofore applied a blend of software solutions using virtual-supercomputer architecture, off-the-shelf network hardware, background computing, a spectrum of numerical optimization techniques, and domain-specific "tricks" to make the computational problems more tractable.

Large-scale computing problems have been around since the Manhattan Project, and indeed, Los Alamos was the necessity that mothered the invention of DBM (colloquially named "Dah Big Machine"). Until recently, development of DBMs, now known as supercomputers, has been driven by military and civilian government needs, and hence, contracts. Typical application domains have been weather forecasting, code breaking, signal and image processing, intelligence evaluation, aerospace engineering, and nuclear weapons design. The resulting machines were designed and built with cost as no object, and their prices reflect that history. Spending $50 M-$150 M on a dedicated number-cruncher is an expense difficult to justify for an investment bank, especially when that glistening rocket ship will become a burdensome dinosaur in about three years.

The alternative has been to scale-up existing software that calculates trajectories for individual instruments, such as options and other derivatives, using pricing models like Black-Scholes. These programs work perfectly well, and provide a flexible platform for future improvements, except that they provide single-instrument answers for one input vector in time-frames on the order of a minute, or at best, several seconds. This is fine for the trader negotiating a position, but when this performance is expanded to include a family of trajectories arising from a wide range of scenarios, and then further multiplied by up to a million instruments in a large global portfolio, even brave souls pale. Waiting a hundred days or more to get an answer somewhat moots the requirement for daily update and response.

The application of the NVSI techniques, in coordination with the recent convergence of several other factors, enables the construction of an affordable virtual-supercomputing system that can usefully meet the need for large-scale, near-real-time portfolio risk analysis. These recent factors are:
- The increased processing speed of affordable workstations,
- Improvements in net-centric computing software,
- The availability of 1 GB DRAM chips, thus allowing 128 GB (40-bit address) or more of RAM in a single box, and
- Increased demand for a solution due to the increased rate of large bank failures (attributable to a lack of sufficient stress-testing).

In essence, no one has demonstrated a software-emulated supercomputer, because the performance would be too slow for the real-time government applications listed above, and providing a one-off solution for near-real-time commercial needs would require massive construction of custom software at a cost nearly as burdensome as buying a big machine.

Instead, we have determined that it is possible to build a suite of leading-edge system programs and software applications, running on networks of off-the-shelf workstations, that gives dedicated, near-supercomputer performance without requiring much (or eventually, any) specialized hardware. Such an approach can evolve with improvements in hardware and software technology. When presented as a retail solution to potential client financial institutions at a reasonable cost ($\frac{1}{100}^{th}$ that of a dedicated supercomputer), the NVSI system becomes a viable product.

What is new here? What is not new is netcentric computing of large-scale problems. This has also been termed "Metacomputing" by the NCSA (National Center for Supercomputing Applications) and its affiliated institutions, and is being actively pursued as an alternative to single-box supercomputing, using wide-area networks of high-end mainframes. The innovation is in building integrated, highly-optimized software that emulates the kit of hardware supercomputing tools and techniques, to create a hardware-independent "virtual supercomputer", optimized to solve a wide class of problems that require large-scale evaluation of independent state-functions in an unbounded hyperspace of multidimensional inputs and outputs. Indeed, our architecture could be used to solve a range of similar problems in other domains, such as credit risk, query-caching, and transaction-processing for global compliance management on the internet, which are decomposable into separate processes of background pre-computation and real-time (demand-query) navigation of a large state-space. NVSI would not be suitable for a domain that required the system to "keep up" with a data stream from the "world" arriving in real-time, such as cryptographic analysis.

The following innovations and/or breakthroughs in RiskScape/NVSI are detailed in subsequent sections.

Innovations in Computational Design:
- Flexible-structure, fully-compacted, variable-length data words, optimizable for specifiable problem domains;
- Flexible connectivity to allow optimal hyperspatial topology (graphs, trees, hypercubes) relative to a spectrum of specifiable problem domains;
- Highly-optimized numerical techniques for moderate-accuracy computation;
- Software emulation of supercomputing structures and processes (such as simple, efficient data representation and handling; inherent vector representation, limited data/computation modes, interleaved memory, table lookup, induced pointers, and distributed & parallelized computation), thus providing cost-effective scaling and enhancement;
- Separation of processes into pre-computation (populating the state-space) and navigation (searching the resulting hyperspace of results);
- Second-order "dæmon" processing to interpolate with finer granularity (mesh enhancement) around selected nodes in state-space.

Innovations in Computational Risk Analysis:
- Simulating only extreme ($3\sigma+\square$) moves in financial variables;
- Optimized model representations and pre-computed parametric function spaces;
- Using virtual or proxy instruments to represent whole classes of securities—such as cash, options and currency swaps—that share the same basis (underlying asset or index);
- Statistical sampling to create a much smaller representative portfolio.

Overview of the NVSI Architecture

The functional block-diagram of the NVSI (FIG. 8) illustrates the essential aspects of the design. The core of the NVSI system is a suite of powerful state-of-the-art applications built around a large (128 GB) dedicated (non-swappable) Mass-RAM, that in later versions will be implemented via shared RAM from network resources (or even hard-storage-based virtual memory). The particular structure of the data words and hyperspatial connectivity are implemented from domain-specific parameters set by the client user via the RiskScape application. The Instantiation Manager then configures the design by creating a set of tables (in CPU RAM) containing metadata, such as data-word definitions, tree structures, pointer parameters, network sharing, and problem-domain specifications & indexes. The state-vectors (hyperspace nodes) are then computed and stored in MassRAM by the Population Manager, which calculates all function (model) values for each scenario. The Population Manager works continually, in background, distributing the burden across the shared Network CPUs. On-demand mark & search (via queries from RiskScape) of the state-space is then handled by the Navigation Manager, in concert with the Interpolation Manager (and its associated Extended MassRAM—EMR—for finer-grained exploration of selected node-neighborhoods). More detail is presented in subsequent sections.

Data Structures

For each entity in the collection (each instrument-type in a portfolio, for risk applications), the NVSI constructs a path-dependent tree (a rooted, ordered, unidirected graph), also more generally termed a metastructure or scenario-tree. The branches (edges) represent variations $\Delta I_x$ in input-parameter $I_x$ with fanout $\kappa$. Every node (vertex) is a state-vector s containing the value (output) of one or more model vectors V for the given instrument (allowing for multiple models to value the same instrument), and the probability P(s) associated with that node (derived from the conditional probability of the particular input parameter variation that led to the current state), for each timestep $t_k$ in a sequence of chosen intervals. An example tree, for fanout $\kappa=9$, is shown in FIG. 9.

For each node i (a point in the state space, H) there is an associated state $s_i$, defined by a 7-tuple state-vector:

$$s_i = (j, k, z, P(s_i), n, V, V'),$$

where:
  $1 \leq i \leq \Omega$, $\Omega \equiv$ cardinality of H=total number of nodes (state-vectors);
  j is the number of the particular branch in a fanout of $\kappa$ (required to derive the back pointer), $$1 \leq j \leq \kappa.$$

k is the number of the time-step for interval $t_k$, $1 \leq k \leq \tau$, $\tau$=chosen number of time-steps=depth of the tree. Note that the intervals may be non-uniform;
  z is an array of logical (Boolean) flags indicating various computation conditions, such as mode (populate or navigate), update status, interpolation-flag, constraint-satisfaction flag, etc.
  $P(s_i)$ is the probability of state $s_i$ occurring, calculated in the standard way from the joint probability of all ancestor nodes, which is in turn derived from the recursive product of marginal and conditional probabilities:

$$P(s_i) \equiv P(s_i \cap \grave{~}s_i \cap \grave{~}\grave{~}s_i \ldots ), \text{ where the } \grave{~} \text{ operator denotes}$$

a parent state (node on the tree), $$= P(\grave{~}s_i) \cdot P(s_i \mid \grave{~}s_i), P(\grave{~}s_i)$$

$$= P(\grave{~}\grave{~}s_i) \cdot P(\grave{~}s_I \mid \grave{~}\grave{~}s_i), 0 \leq P(s) \leq 1.$$

For RiskScape applications, the conditional probabilities are just the transition probabilities for changes in financial variables. In general, although the states (output function values) are not usually path-dependent (except for some exotic instruments), the transition probabilities are conditional. Thus, the probability of a change in volatility $\sigma$, for example, is dependent on the baseline:

$$P(s_i | s_i) = P(\Delta \sigma | \sigma);$$

n is the number of functions or variables included in V, and thus essentially determines the data-word length, where:
  $V \equiv [v_1, v_2, \ldots v_n]$ is the value-functional, a set of one or more v, which are domain-specific function equations, input parameters, output variables, or parameter-pointers, derived from pricing models (or any state-independent equation from the problem domain), where a given v is generally defined by:

$$v \equiv f(t, I(t)), \text{ where:}$$

$I(t) \equiv [a, b, c, \ldots ]$ is an array (vector) of m input variables that are subject to change ($\Delta I_X$) at each time-step, thus generating the various $\kappa$ branches for each node;
  V' is the dual of V, containing the next-day's "aged" set of values, computed by the Population Manager after it computes V.

A particular state is defined by computing scalar values for all the variables (or functions) v defined in the state-vector, for the particular node in the tree.

Note that $\kappa$ is just the total number of variations over I. The way that $\kappa$ is mapped onto I, i.e., how the available granularity in variations is distributed across the input variables, is defined by the client-user.

Three key features of the data structure are:
  Pointers are not stored, but induced. That is, successor nodes are indexed by an algorithm (modified from Knuth, "The Art of Computer Programming" (3 Vols), Reading, Mass., Addison-Wesley) that computes addresses for child nodes in balanced trees as adjacent words in memory. For parent node i, the child nodes on its subtree are numbered by:

$$\kappa \cdot (i-1) + (1+j), i > 0, 1 \leq j \leq \kappa.$$

This enables fast calculation of pointers, saves an enormous amount of storage, and wastes virtually no memory space. And because the trees are fixed until the state-space is recreated for a new domain and a new set of scenarios, there is very little shuffling or garbage collection required.

The actual data values are stored as bit-string integers, even for floating-point numbers, which are stored as fixed-point integer pairs (mantissa & exponent) of greatly shortened length to handle just as much accuracy as needed (typically 10 bits—for 1 part in 1000—instead of the 32 that is standard in desktop ALUs). These short integers are passed to the system ALU for simple integer arithmetic, thus dramatically decreasing the computational demand.
  Exponentials, logarithms and roots are retrieved via stored-table lookup, again at just the accuracy required.
  The total number of nodes (or states), $\Omega$, in the hyperspace H is constrained by the total amount (in bytes) of dedicated MassRAM (denoted by Mem) available, and $\Lambda$, the characteristic length (in bytes) of the data words. Thus, $$\Omega(H) = \text{total number of nodes (states) in the hyperspace} \equiv Mem/\Lambda.$$

As shown later, a typical instantiation for RiskScape yields $\Omega \sim 10^9$ states.

A scenario is the path of events, or conditional changes, that leads to a given state. Thus, each node represents the result of one scenario. The entire set of scenarios yields a scenario-tree, which is exactly one metastructure. Note that, typically, different metastructures are defined on the same landscape of events, and thus share the same set of scenarios. The total number of separate trees is therefore constrained by both $\Omega(H)$ and the chosen fanout $\kappa$ (derived from the desired granularity in input variation) and $\tau$ (the total number of time-steps desired in the analysis).

For balanced trees, the number of nodes M in a tree is given by the sum of a geometric progression of base $\kappa$:

$$M = [\kappa^{(\tau+1)} - 1]/(\kappa - 1)$$

$$= \text{total number of scenarios}$$

$$\cong \kappa^\tau, \text{ for } \kappa \gg 1.$$

The total number of available scenario-trees (metastructures), N, is therefore:

$$N = \Omega/M$$

RiskScape Structures & Design Factors

The NVSI, along with the RiskScape Intelligent Financial Risk Application, was originally designed to optimize the computation of future portfolio values over a range of scenarios designed to uncover "dragons", the potential catastrophes that can result from less likely events (changes in relevant financial variables) that lie in the "fat tail" of quasi-lognormal (kurtotic) distributions presumed to underlie most financial variations. Typically, large global portfolios are composed of 100,000 to 10M instruments (securities), and include a wide range of types: stocks (equities), bonds, futures, currencies, swaps, convertible debt, interest-rate instruments, options (on all of these), and other exotics. Various models of these instruments exist, and the output variables include price and the various moments (the "greeks") of the model function. Typical input variables, which are changed systematically in a simulation to construct a scenario tree, include $p_u$ (price of the underlying asset), the asset volatility $\sigma$, interest rate $i_r$, and interest-rate volatility $\sigma_{i_r}$. Some models have-closed-form solutions that are relatively straight-forward to evaluate (such as Black-Scholes). Others, such as those for interest-rate options, require some form of stochastic simulation (such as Monte Carlo), finite-difference methods, or trinomial tree expansions for determining term structure (such as Black, Derman, Toy), and are thus far more cumbersome to compute.

Probability Values

In the prototype version designed for use in financial risk analysis, the data structure has elements that are key for future-risk computation. For portfolio evaluation, the conditional probabilities $P(\Delta I_x | I_x)$ correspond to the actuarial transition-probabilities derived from tables of historically-calibrated movements in financial variables, or extracted from relevant time-series of changes in those variables. For risk analysis, the risk-adjusted probabilities are also important, so the RiskScape interface allows the user to choose either, or both. If both are specified, one of the alternative probabilities is stored in one of the n variables v.

With a $\kappa$ (fanout) of only 12-16, and four input variables, for example, there is not enough granularity to allow for joint transitions (such as $\Delta\sigma=4$ & $\Delta p_u, =-0.5$). Thus, in the prototype, branches typically denote orthogonal moves, that is, changes in one input variable at a time. However, implicit nonorthogonality can be approximated by using historically-derived correlations between financial variables. This approach relies on the fact that, with large moves, correlations between financial variables become tighter. Alternatively, $\kappa$ can be increased to allow for joint transitions, consonant with available resources.

To make the computation tractable for large portfolios (1M+instruments), and congruent with the theme of future-risk analysis, which is to look at possible catastrophes ("dragons") arising from large moves in the input variables, only changes of $\Delta I_x > 3\sigma$ are typically evaluated. Although available tables of transition probabilities do not always contain such data, the required probabilities can be easily extrapolated, as the distributions (or at least the first moments) are known.

Instrument Proxies

Even with 128 GB RAM and modest tree size ($\kappa=12$ and $\tau=6$), for large heterogeneous portfolios an unaugmented NVSI can support no more than ~100-1000 metastructures (separate scenario trees), depending on the word length $\Lambda$. To compensate, one of the innovations in the architecture is therefore to use "virtual" or proxy instruments: state-vectors with V composed of generic model functions for all the securities based upon the same underlying asset (or base index). The actual instrument prices can then be calculated during navigation, by evaluating the corresponding function and converting back using standard scaling and correlation coefficients. When a proxy state is computed (during the hyperspace-population phase), the various prices and moments of a given model are calculated over a range of values, thus creating a parametric space that brackets the range of possible magnitudes for the portfolio instruments. During the navigation phase, the actual instrument prices (and other moments) are then calculated via extraction of values from the pre-computed parametric-space, using the state-dependent input parameters stored in the proxy state-vector.

For example, suppose the actual instrument is a standard European option, defined by free parameters K(=strike-price), S(=$p_u$), r(=$i_r$), $\delta$(=div yield), T(=time-to-expiration), and $\sigma$(=volatility). If the model of choice is Black-Scholes, the option price can be obtained from a "normalized" space defined by only three parameters: $\{K/S, (r-\delta)T, \sigma\sqrt{T}\}$. During the population phase, the parametric pricing space is pre-computed (creating a "parametric-hypercube") and mapped to the proxy, and the values of the input vector I are stored in s for each node in the scenario tree. Then, during navigation, the price p of the actual portfolio option instrument is calculated (marked to scenario) simply by extracting a virtual price $p_{proxy}$ from the associated parametric-hypercube using the input values (K, S, r, $\delta$, T, $\sigma$) and then transforming the result using known scaling ($\alpha$) and correlation ($\beta$) factors. That is, $$p = p_{proxy} \cdot \alpha \cdot \beta$$

Recall that each different proxy represents instruments with different underlying assets, and each proxy is evaluated over one scenario-tree. Thus, the number N of available metastructures determines the number of available proxies onto which the portfolio can be mapped.

There can be many different classes, or types, of instruments in a portfolio, including:
1. Equities & their derivatives (d)
2. Debt Instruments & d
3. Swaps & d
4. Currencies & d
5. Collateralized Mortgage-Backed Obligations & d
6. Exotics (such as Interest Rate, Barrier, Lookback and Knockout options).

Some types are much more cumbersome to compute, as indicated above. For example, some of the exotics require complex use of input parameters, such as interest-rate derivatives that use a path-dependent interest-rate curve (or actually, an interest-rate vector). Models such as Heath-Jarrow-Morton and Black-Derman-Toy are valued with state-dependent trees, which the NVSI architecture already supports.

The proxy state-vector must contain models or parametric references for as many types of instruments as there are in the portfolio. For example, a proxy might contain variables for cash, futures, standard options (all Type 1), sovereign debt (Type 2), and interest-rate options (Type 6). All instruments of Type 1, 2, & 6 in the portfolio that are also based upon the same underlying asset or base index (such as the S&P 500), are linked to this proxy. Thus, there need to be as many proxies as there are underlying indexes in the portfolio (typically in the hundreds).

Data Word Structure

The structure and size of a data word (the bit-wise representation of a state-vector) is specified by the Data-word Definition Table (see MetaTables), which is constructed by the Instantiation Manager according to specifications received from the client-user. For each proxy, the Population and Navigation Managers carry this table around, so to speak, as a part of their operation.

Data-word structure is flexible. The default is as follows: The back-pointer, j, indexes the branch (of $\kappa$) from the parent node that a state occupies. The prototype allows for a maximum fanout of $\kappa=64$, so the length of j in bits is:
 len j=6 bits.
The prototype allows for up to $\tau=16$ time steps, so
 len k=4 bits.

The flag-vector, z, is one byte (to handle up to 8 conditions):
len z=8 bits.
Probabilities must reflect likelihoods derived from large-move events, and need be no more accurate than 1 part in 1000 (three significant digits). Thus,
len P(s)=10 bits.
The number n of variables in the value-vector V is unbounded, but the prototype allows for 256. Thus,
len n=8 bits.
Strictly, n is redundant, because the data-word-definition table (created by the Instantiation Manager) specifies the number of variables in the state-vector. Yet, placing n in the state-vector promotes data integrity, and its storage penalty is small.
The first part of a state-vector (everything but V), denoted by ⟨s, thus has a length:
len ⟨s=36 bits.
Finally, the variables in V can represent function outputs, parameter ratios, input variables, statistical-distribution points, partial-derivative values, or parameter-reference pointers. In general, the magnitude ranges are known and specified in the data-word-definition. Thus, the only part stored in the state-vector is the integer mantissa, again typically to three significant digits for dragon-hunting. In those cases where the range is arbitrary, or infinite, an integer exponent to accommodate $10^{\pm 15}$ (5 bits) is also stored. The default, then, is:
len v=10 bits or 15 bits.
For the complex proxy described above, which we shall use as a conservative benchmark, the state-vector would contain one function variable for a cash index, one variable for each of several (say four) futures, four variables from the input vector I=[$p_u$, σ, $i_r$, $σ_{i_r}$] for the Type 1 options, perhaps an additional four (different) input variables for the Type 2 options, and an interest-rate vector of, say, eight variables, that represents the path-dependent interest-rate curve for the Type 6 options. We can also imagine that some of the exotics have models so complex that the parametric-hypercube yields a family of curves; or perhaps an instrument-type is so new that its model has not yet been parameterized. In either case, variables (say ten) representing curve-selection values, or five slope-intercept pairs for linearized segments of the curves, need to be stored.
There is also one variable required to store the alternate probability measure.
Then, $n$=number of variables≅1+4+4+4+8+10 (or 5·2)+1=32.

If most of the price-related variables (cash, futures, curve-segments) require stored exponents, then len $V$≅(15·15)+(17·10)=395 bits.

Accounting for the length of V' (the time-dual of V), this yields len $s$=len ⟨$s$+2·len $V$=36+2·395=826 bits.

The actual word-length, in bytes, for our benchmark proxy state-vector, is then

Λ=⌈len $s$/8⌉=104 bytes.

This will be used to calculate relevant performance parameters.
MetaTables
The user specifies the nature of the problem domain, and all relevant data, via the RiskScape Interface, using a Scenario Description Language (SDL). The Instantiation Manager then creates and configures a set of tables to implement the specifications. Typical tables include:
Data-word Definition (including field structure & bit-masks for storage and field extraction)
Hyperspace Definition (topology, κ, τ)
Node Index (as an adjunct to pointer induction)
Proxy Definition (types, model variables, parameters)
Scenario Definition (input vectors I, the mapping of I to κ)
Input Variable Data (updated & adjusted values for all possible $I_x$, such as σ, $i_r$, etc.)
Probability Transition Data (derived from commercial tables or extracted from time-series)
Arithmetic Lookup (exponentials, logarithms, roots)
Conversion Factors (scaling, coefficient, parameter-estimation data)
Portfolio Data (coded description of all instruments and their specifications, including proxy links, and whether or not the instrument is to be included in the reference sample).
Pricing-Model Parametric Data (pre-computed hypercubes of pricing-model values and moments)
Some of the tables are quite large, such as the Portfolio Data (1 million records or more) and the Node Index (a billion records). All are stored on hard disk, but some are also resident in CPU RAM (not MassRAM, which holds only the hyperspace H), such as the Data-word Definition, Proxy Definition, Probability Transition, Input Variable and Scenario Definition tables.
The Infrastructural-Technology Suite
The core NVSI modules are:
RiskScape Application: the user specifies (using SDL) the nature of the problem domain, the type of structures involved, the fanout κc, the time-depth τ, the mapping of κ to the input-vector I, the portfolio to evaluate, the scenarios desired, the event and probability thresholds, and so forth.
Instantiation Manager: configures all the definition tables and MassRAM to handle the domain specifications from RiskScape.
Population Manager: computes all state-vectors in background (off-line) processing, according to the rules and tables specified by the Instantiation Manager. One of the key optimizing techniques used is to simulate interleaved memory by having the Population Manage first compute all the values of V, to have them available to the Navigation Manager (see below) as soon as possible, and then it computes the next updated (dual) set of values V'—the same variables, same value of t—but updated for the next day's data, as the portfolio is "aged". The Navigation Manager then selects the second set of values (if the ready-flag has been set by the Population Manager), so that portfolio update is performed synchronously, over the entire hyperspace.
Navigation Manager: invokes queries from the client-user (in this example via the RiskScape Application) to search the hyperspace H, evaluate H over each scenario, mark the nodes that either meet the event & probability thresholds, or that warrant further exploration (via the Interpolation Manager). It is the Navigation Manager that responds in near-real-time to user requests, and "walks the landscape" of the hyperspace to hunt for dragons.
Interpolation Manager: in concert with the Navigation and Population Managers, it applies mesh enhancement to selected nodes. That is, it creates an expanded tree-fragment with a finer granularity in the neighborhood of the node, to yield more accurate values that may lie "between" certain states. This enhancement may entail expanding the spatial granularity, via a larger κ with finer gradations in ΔI, or using correlations to simulate joint transitions. Enhancement may also be temporal, expanding τ locally by creating a tree-fragment with finer-grained time-steps (and this may also use correlations to interpolate variations in input variables).

Performance Parameters & Evaluation

In this section, boundary conditions and typical mid-range values for spatial (storage) requirements and temporal performance are derived.

Spatial Parameters

Recall that:
Λ=characteristic data-word length, and
Ω(H)=number of available states in H≡Mem/Λ, Mem=available memory (in bytes).

Thus, for the prototype MassRAM of size 128 GB (=137×10$^9$ bytes), and a typical Λ (for our benchmark proxy) of 104 bytes:

$$\Omega=(137\times10^9/104)\cong10^9=1 \text{ billion nodes (or states)}$$
available in the hyperspace.

Note that with a Λ~50 bytes (for very simple Type 1-only proxies) to 200 bytes (for very complex proxies representing instrument Types 2, 5, & 6), the result is still about the same.

For the same size scenario tree as used earlier, with κ=12 (allowing three gradations, or moves, for each of four input variable) and τ=6 (allowing for six time-steps, such as 1 day, 3 days, 1 week, $t_{VaR}$~20 days, 3 months, 6 months), then M=tree size≅$25^6$≅$3\times10^6$=3 million nodes in the scenario tree.

Thus,
N=number of scenario-trees=Ω/M=$10^9$/($3\times10^6$) ≅300=number of proxies allowed.

The number of proxies available to map the portfolio onto is therefore about 300, for κ=12 and τ=6. Can a large global portfolio be mapped to only 300 proxies, that is, only 300 base indexes? Absolutely. There are only six types of proxies, and linking these to 300 underlying assets/indexes would cover most of the developed world.

To bound this result, consider a scenario tree with a larger κ of 16:

M=$16^6$≅$1.7\times10^7$⇒N~60, still large enough to represent a fairly diverse portfolio.

Suppose that we don't need six time steps, but only four (1 week, $t_{VaR}$, 1 month, 3 months):

M=$16^4$≅65,536 ⇒N~15,000.

Thus, reducing the number of time-steps significantly increases the number of proxies that can be created. If we wish to increase the granularity of input variations, perhaps allowing for joint transitions (like Δσ & $\Delta p_u$), then κ can be increased to 32 or 64. If a client-user simply wanted to value a portfolio at one timestep (τ=1) $t_{VaR}$, and with very high precision in the scenario mesh (κ=64), then N=$10^9$/64≅16 million.

At this level, a sizable portfolio can be evaluated for future risk directly, without the need for proxies.

The realistic spectrum for N is thus:

$1=N_{32,6}<(30=N_{32,5})<(N_{16,6}\sim60)\leq(N_{\kappa,\tau}=N_{12,6}\sim300)\leq$
$(N_{16,4}\sim15,000)\leq(N_{64,1}=16 \text{ million})$.

Since many portfolios require less than 100 base indexes, then with a typical N of ~300 available for our benchmark tree of κ=12 and τ=6, the effective fanout κ can be increased (thus increasing the input-variation granularity), by indexing an array of proxies to one instrument-class, each identical except that the scenario-trees use different ΔI increments. For example, one tree could assign each branch to variations of (0, ±3σ), another tree have branches for ±8σ, and another for ±12σ.

As we show in the temporal performance calculations, the virtual effective throughput for navigation is high enough that it will be possible to implement MassRAM not only as a shared network resource, but eventually, as virtual memory using hard sequential storage. That is, because the hyperspace trees are fixed and space-filling for a given problem domain, the RAM transaction volume is low, with little random access. Thus, by using JINI technology (for example) over shared network resources, NVSI v2.0 can use FIFO paging from optimized disk storage, performing a look-ahead page-fetch in 16 GB (or larger) segments, while still not slowing the Navigation Manager. Under such an operating system, Mem is virtually unbounded, and we could realistically process $10^{12}$ nodes (which still only requires a 40-bit address) or more.

Temporal Parameters

Performance of the NVSI is partitioned into the two primary phases: the time $T_{pop}$ to populate (compute and fill all the state-vectors in) the state-space, and the time $T_{nav}$ to navigate the space (evaluate the domain collection—such as a financial portfolio—at each scenario, and flag selected nodes for states that meet the criteria).

The key to the NVSI idea is that the apparent (effective) throughput in response to a user query is driven by the navigation-time, as the population-time reflects background (off-line) computing.

As a reference, performance parameters are derived for the RiskScape problem domain, using the benchmark proxy already described.

Populate

The population time has four principle components:
1. A one-time setup by the Instantiation Manager;
2. A one-time pre-computation of the parametric-hyper-cubes for all relevant pricing models;
3. A recurring (for each daily update, as the portfolio is aged) recalculation of all values in V for every node in H; and
4. Background I/O and network-sharing overhead, which varies according to the amount of real-world data capture, and the size of H.

It is the third component that is most characteristic of $T_{pop}$. For our benchmark proxy, the calculation requirements for each of the (s values is:
  j: 3 integer operations (INT)
  k: 1 INT
  z: 8 INT
  P(s): 1 lookup (~1 INT) & one floating-point multiply (~1 FLOP, FLoating-point OPeration)
  n: 1 lookup & store ~1 INT For V, the calculation times are highly varied. The cash variable requires 1 INT, the futures each require ~3 FLOP+1 lookup (~1 INT), and the alternate probability ~1 INT+1 FLOP. Each of the input parameters involves 1 FLOP to calculate, and similarly for the interest-rate values. The curve-selectors and/or slope-intercept pairs require ~2 FLOP. Each of the 32 variables values takes 1 INT to store in the state-vector. Thus, the total (recurring) time to populate one state-vector for our benchmark is:

1(1 INT)+4(3 FLOP+1 INT)+4(1 FLOP)+4(1 FLOP)+
  8(1 FLOP)+10(2 FLOP)+1(1 INT+1 FLOP)+
  32(1 INT)=38 INT (~4 FLOP)+49 FLOP≅53
  FLOP.

The total FLOPs, $F_{pop}(3)$, to populate all nodes is then:

$$F_{pop}(3) = \Omega * 53 \text{ FLOP} \sim 53 \times 10^9 \text{ FLOP} \sim 53 G_{FLOP}.$$

We take as a baseline-reference CPU a typical mid-range, stand-alone workstation, with a computational throughput of $R=10^7$ FLOPS (FLoating-point Operations Per Second)=10 MFLOPS. Then, $$T_{pop}(3) = (53 \times 10^9 \text{ FLOP})/(10^7 \text{ FLOP}/\text{sec}) = 5300 \text{ seconds} \sim 1.5 \text{ hours}.$$

To calculate the pre-computation time for the various pricing-model parametric-hypercubes, we require the characteristic computation time for typical models, and a choice of granularity in the parameter space. For Black-Scholes options, computing one price and the associated moments ($\Delta$, $\Gamma$, vega, $\Theta$, $\rho$, $\tau$) takes ~70 FLOP; one barrier or lookback option & moments: ~1000 FLOP, and one exotic derivative (such as Black-Derman-Toy or Heath-Jarrow-Morton): ~2,000–20,000 FLOP.

One of each type is needed for the benchmark proxy. Assuming three parameters for each (actually, six is more appropriate for exotic derivatives, but the hypercube becomes enormous, so each point is made a vector that embeds a family of curves), and assuming a granularity of 100 increments per parameter (dimension), then the number of points for each parametric-hypercube=$10^6$ (1 million).

The total computation to create a Type 1 hypercube is thus $70 \times 10^6$ FLOP, and for a Type 2 hypercube, $1000 \times 10^6$ FLOP, and a Type 6, $20000 \times 10^6$ FLOP.

Thus, the amount $F_{pop}(2)$ of parametric-hypercube precalculation is dominated by the exotics, $$F_{pop}(2) = \text{FLOPS}(\text{Type } 6) + \text{FLOPS}(\text{Type } 2) \sim 2.1 \times 10^{10} \text{ FLOP} \sim 21 G_{FLOP}$$

For the 10MFLOP CPU, this yields $$T_{pop}(2) = 2100 \text{ seconds} \sim \tfrac{1}{2} \text{ hour}.$$

If we estimate the Instantiation time $T_{pop}(1)$ at about the same (to fill all the tables, some with millions of entries), ~½ hour, and that system overhead (category 4) doubles all the other times, then we have:

$$T_{pop}(\text{once}) = 2 \cdot [T_{pop}(1) + T_{pop}(2) + T_{pop}(3)] \cong 5 \text{ hours, and}$$

$$T_{pop}(\text{recurring}) = 2 \cdot T_{pop}(3) = 3 \text{ hours}.$$

That is, the entire hyperspace H of states can be repopulated daily, allowing for real-time aging of the portfolio.

Navigate

Navigation of H is the process of evaluating (pricing fully) the entire portfolio over the entire scenario-tree, and flagging the nodes (states) that satisfy the client-user query (on both probabilities and values). The Navigation time, $T_{nav}$, is thus dominated by the time required to price the portfolio, which entails pricing each instrument, and summing over the entire collection. Pricing an instrument involves calculating the virtual price (and all moments) from the proxy, and transforming with known multiplier coefficients (scaling, a and correlation, $\beta$). Doing this in turn requires taking each value stored in V (usually a set of input variables I), combining it with the free parameters of the instrument (such as X & T for a Black-Scholes option), and calculating the relevant selection parameters, used to either access a parametric-hypercube, or for newer instruments or open-form models, to calculate the final function output directly.

The process of evaluating the portfolio price for one scenario, that is, for one node (state) in the scenario-tree, we term mark-to-scenario (m-t-s). Evaluation of the portfolio over all scenarios, we term mark-to-landscape (m-t-l).

Flagging a node involves only two compares and a bit-flip in z, so $T_{nav} \cong T_{m-t-l}$, which is given by:

$$T_{m-t-l} = [T_{price} \cdot \omega + T_{sum}] \cdot M,$$

where: $T_{price}$ is the characteristic time to price one actual instrument (and all of its moments),
$\omega$ is the total number of instruments in the portfolio, and
$T_{sum}$ is the time to add all of the instrument prices to yield a total value for one state.

Note that only one instrument-type will be calculated for any given proxy-vector (although the proxy may contain data to price all the various types it represents).

One of the essential aspects of the NVSI architecture is that, because the function-spaces are pre-computed (during the populate phase), the time to extract the price-values is nearly independent of model complexity. Instead, evaluation time is dependent on the number of parameters required to calculate for extraction of the proxy price.

Of course, the cash and futures values are stored in s directly, so pricing their corresponding instruments is trivial. Thus, a more realistic estimate is obtained by calculating the $T_{price}$ for the options, all of which are comparable to each other.

For the Type 1 option, the three parameters for extracting the price (and any other moment) are: $\{K/S, (r-\delta)T, \sigma\sqrt{T}\}$. Each parameter requires about 1-2 FLOP to calculate, for a triplet total of ~4 FLOP. All of the moments are obtained with the same parameters at the same time from the parametric hypercube, so the time to obtain the entire proxy-price is just 4 FLOP. To value the instrument-price, each proxy-price moment is then multiplied by a combined factor $\gamma = \alpha \cdot \beta$, which adds 1 FLOP to the process.

Thus, to price all eight moments (p, and 7 greeks, for advanced models) of an actual option instrument, the amount of computation required (in FLOPS), $F_{price}$, is given by:

$$F_{price} = (4+8) \text{FLOP} = 12 \text{ FLOP}.$$

For a 1M ($\omega = 10^6$) instrument portfolio, the FLOPs to mark the entire portfolio to all scenarios for our benchmark is then:

$$F_{m-t-l} = [F_{price} \cdot \omega + F_{sum}] \cdot M$$
$$= [12_{FLOP} \cdot 10^6 + 10^6] \cdot (3 \times 10^6) = 39 \times 10^{12}_{FLOP} = 39 T_{FLOP}.$$

The computation required to fully risk-evaluate a 1 million instrument portfolio over an entire scenario tree ($\kappa=12., \tau=6$) is: 39 TFLOP.

On the reference CPU, the time required is then:

$$T_{m-t-l} = F_{m-t-l}/R = (39 \times 10^{12} \text{ FLOP})/(10^7 \text{ FLOP}/\text{sec}) = 39 \times 10^5 \text{ seconds} \cong 1100 \text{ hours}.$$

At this point, two key components of the NVSI come into play:

A standard procedure for large-scale computing is two-pass simulation. First, a statistically-representative sample of the full problem domain is evaluated, marking (flagging) the nodes of interest, and then the full domain is evaluated over the flagged nodes. This is equivalent to a mesh-enhancement for the navigation phase. In portfolio-risk analysis, a 1000-fold reduction of the portfolio to a sample is well within norms. Under this compression, then, $$T_{m-t-l}(\text{sample}) = (39 \times 10^9)/10^7 \cong 1.1 \text{ hour}.$$

Assume that one in a thousand nodes (states) are flagged for full evaluation of the entire portfolio (because the sample portfolio value meets the client-user query criteria). Then, $T_{m-t-l}$ (entire)≅1.1 hour, again.

Thus, the total navigation time is:

$T_{nav} \cong T_{m-t-l} = T_{m-t-l}$(sample)+$T_{m-t-l}$(entire)=2.2 hours, for 1 CPU.

The netcentric component: With a typical 100 BaseT LAN of 100 workstations, with a 50% availability (sharing-efficiency), we have:

$T_{nav}$ (Netcentric)=(2.2 hours)/(100·0.5)≅158 seconds~2.6 minutes.

Using netcentric computing and problem-domain optimization, the entire portfolio can be navigated in about 2½ minutes, that is, in near-realtime.

Recall that the client-user measures performance in terms of the response to query, that is, on-demand access to H over all scenarios. Thus, we calculate an effective (virtual) throughput for this computation, optimized for portfolio risk-analysis with 100 shared reference-CPUs (in terms of virtual-FLOPS, or VFLOPS) as:

$R_{NVSI}$/(Risk Domain/100)=$F_{m-t-l}/T_{nav}$=39 $T_{FLOP}$/158 sec≅250 $G$ VFLOPS.

A bounded spectrum for performance (in units of GVFLOPS) is then:

$5 = R_{NVSI}(RD \times 1) < 25 = R_{NVSI}(RD \times 10) < 250 = R_{NVS1}(RD \times 100)$ Note that the value for 1 CPU assumes a dedicated machine.

Comparison with Commercial Solutions

For comparison, if one were to simply "scale-up" existing instrument-valuation software, and run it on the best mainframe (dedicated hardware supercomputer) available, then a similar calculation to the above would involve very different computation times for different instruments. If we assume a typical global portfolio with 1M instruments, and a mix of 50% Type 1, 40% Type 2 and 10% Type 6, then the total computational demand is given by:

$(0.5 \cdot 1000_{FLOP} + 0.4 \cdot 70_{FLOP} + 0.1 \cdot 20,000_{FLOP}) \cdot 10^6 + 10^6) \cdot (3 \times 10^6) = 7587 \times 10^{12}$ $_{FLOP}$=7587 $T_{FLOP}$.

A CRAY T3E Supercomputer has a peak (burst) throughput of ~2.2 TFLOPS, and a sustainable rate (which we estimate is appropriate for the I/O requirements of this problem space) of R~250GFLOPS. Therefore, even on a T3E the Risk Domain problem would require:

$T_{nav}$(CRAY T3E)=(7587×10$^{12}$ FLOP)/(250×10$^9$ FLOP/sec)≅30,000 sec≅8.4 hours.

On a more affordable (and obtainable for a financial institution) CRAY T90 (for which we estimate in this problem space a sustainable R~18 GFLOPS), the problem would take nearly 5 days, and on a conventional high-end business mainframe, about 100 days.

Price/Performance

The most straightforward measure of price/performance is simply cost/R. The projected cost of version 1.0 of NVSI is ~$10M. The cost of a fully-populated CRAY T90 is ~$20M, and a fully-populated CRAY T3E~$100M. Thus:

P/P NVSI=($10×10$^6$)/(250×10$^9$ VFLOPS)= 0.00004 $/FLOP~0.004¢/FLOP

P/P C90=($20×10$^6$)/(18×10$^9$ FLOPS)=0.00111 $/FLOP

P/P T3E=($100×10$^6$)/(250×10$^9$ FLOPS)=0.00040 $/FLOP

Therefore, the NVSI is about 10 times more cost-effective than the only other machine that can solve the problem in reasonable time. And this does not even include the extended costs for the CRAY machine of software development (including staff), machine-room support, & depreciation.

In contrast, all of our NVSI calculations have been conservative: in MassRAM use, problem-complexity, structural-requirements, estimated calculation times, and network sharing & resources.

With these factors considered, we project that the cost of an NVSI implementation will be 50-100 times less than any comparable hardware-based commercial solution.

What have we really achieved? In theoretical terms the three fundamental breakthroughs are:

1. The NVSI architecture allows flexible (and extensible) reconfiguration of the system memory in such a way that the actual topology of the computational surface is modifiable. This means that a true virtual machine is constructed, one which is unique for each problem domain. One of the principle assertions of computability is that the more closely the architecture of the machine matches the architecture of the problem being solved, the more efficiently the machine will solve that problem. In our case we accomplish this because the core of the NVSI is a problem-domain-optimized solution manifold. This solution manifold has been created, or "instantiated", in system memory (hence the name for one of the component modules: the Instantiation Manager). In the case of the RiskScape application, this solution manifold is a combination of a rooted, ordered, unidirected graph and a set of pricing-model hypercubes. This manifold is unique to the problem of financial portfolio stress-testing, and is one of the principal reasons that multi-gigaflop throughput is attained.

2. The power of netcentric distributed computation is brought to bear in two ways. First, we break the metaproblem into two independent components: that which can be pre-computed and stored in memory, and the real-time query process. The Population Manager takes responsibility for the former, and the Navigation Manager for the latter. This enables a temporal compression to be applied to the problem. In the case of RiskScape the solution manifold requires on the order of 75 GigaFLOP (75×10$^9$ floating-point-operations) to fully populate all of the pricing vectors in state space. However, to query (i.e. fully Navigate) this manifold such that a one million instrument portfolio is evaluated against three million scenarios, takes less than an hour of user time. This theoretical performance assumes that only 10 "Pentium-Class" CPUs are dedicated to the Navigation process. With 100 Pentium IIIs the process runs in near real-time.

3. This is all accomplished with off-the-shelf hardware. In the first version of the NVSI platform, the system will require one dedicated machine as the memory manager. However, we anticipate that with coming advances in Network Operating Systems this constraint will be removed. We especially anticipate advances in SUN MICROSYSTEMS JINI which enables peer-to-peer communication between component hardware. Sun Microsystems engineers suggest that this peer-to-peer addressing will evolve to the point that the RAM on any given physical machine can be directly addressed by other physical machines. This will mean that our NVSI platform will be fully "virtualized", requiring no dedicated hardware at all. At that point, perhaps 18 to 24 months from the date of this writing, NVSI will be truly and completely a virtual supercomputer. Then, as the software continues to evolve, so does the "machine".

What is claimed is:

1. A system to determine a solution for a problem including a solution space represented by one or more nodes, said system comprising:
a computer system, including at least one processor and an operating system to control operation of said computer system, to dynamically configure and emulate a hardware architecture of a processing system that processes said one or more nodes to determine said solution for said problem, wherein at least one of said nodes includes data for said problem and said computer system further includes:
a virtual machine unit to emulate said hardware architecture and manage said nodes within said solution space, wherein said hardware architecture is designed to process said nodes;
a virtual operating system to configure said virtual machine unit and to control operation of said virtual machine unit to emulate said hardware architecture based on parameters, said virtual operating system including:
an instantiation engine to create and to delete said nodes;
a configuration engine to configure said nodes of said solution space in a topology to determine said solution for said problem;
a population engine to store and to evaluate said data for said problem within said nodes;
a navigation engine to traverse said topology and to process selected ones of said nodes based on said parameters to determine said solution; and
an evolution engine to update said nodes and said topology based on said parameters.

2. The system of claim 1, wherein said emulated hardware architecture is dynamically reconfigurable.

3. The system of claim 2 wherein said emulated hardware architecture comprises reconfigurable elements including one or more of:
a type and number of units in said emulated hardware architecture;
a structure of memory;
registers;
data words;
index words;
machine instructions;
node structure and topology; and
a configuration unit to configure configurable elements of said emulated hardware architecture.

4. The system of claim 3, wherein a configuration of said dynamically reconfigurable hardware architecture includes one or more of an instantiation unit to create and to delete said nodes, a population unit to store and to evaluate data within said nodes, a navigation unit to traverse said topology and to retrieve information from selected nodes, a node counter, and an arithmetic logic unit to perform arithmetic operations.

5. The system of claim 1, wherein said computer system includes one or more of a conventional computing platform and a virtual-supercomputing platform.

6. The system of claim 1, wherein said computer system includes one or more of a Von Neumann computing platform and a Non-Von Neumann computing platform.

7. A program product apparatus comprising:
a computer useable memory device with computer program logic stored therein, the computer program logic, when executed by a computer system, causes the computer system to determine a solution for a problem including a solution space represented by one or more nodes and said computer program logic includes:
a virtual machine unit to dynamically configure and emulate a hardware architecture of a processing system that processes said one or more nodes to determine said solution for said problem, wherein at least one of said nodes includes data for said problem;
a virtual operating system to configure said virtual machine unit and to control operation of said virtual machine unit to emulate said hardware architecture based on parameters, said virtual operating system including:
an instantiation engine to create and to delete said nodes;
a configuration engine to configure said nodes of said solution space in a topology to determine said solution for said problem;
a population engine to store and to evaluate said data for said problem within said nodes;
a navigation engine to traverse said topology and to process selected ones of said nodes based on said parameters to determine said solution; and
an evolution engine to update said nodes and said topology based on said parameters.

8. The apparatus of claim 7, wherein said emulated hardware architecture is dynamically reconfigurable.

9. The apparatus of claim 8, wherein said emulated hardware architecture comprises reconfigurable elements including one or more of:
a type and number of units in said emulated hardware architecture;
a structure of memory;
registers;
data words;
index words;
machine instructions;
node structure and topology; and
a configuration unit to configure configurable elements of said emulated hardware architecture.

10. The apparatus of claim 9, wherein a configuration of said dynamically reconfigurable hardware architecture includes one or more of an instantiation unit to create and to delete said nodes, a population unit to store and to evaluate data within said nodes, a navigation unit to traverse said topology and to retrieve information from selected nodes, a node counter, and an arithmetic logic unit to perform arithmetic operations.

11. The apparatus of claim 7, wherein said computer system includes one or more of a conventional computing platform and a virtual-supercomputing platform.

12. The apparatus of claim 7, wherein said computer system includes one or more of a Von Neumann computing platform and a Non-Von Neumann computing platform.

13. A method of determining, via a computer system, a solution for a problem including a solution space represented by one or more nodes, said method comprising:
(a) dynamically configuring and emulating, via a computer system, a hardware architecture of a processing system that processes said one or more nodes to determine said solution for said problem, wherein at least one of said nodes includes data for said problem;
(b) configuring and controlling emulation of said hardware architecture based on parameters, wherein step (b) further includes:
(b.1) creating and deleting said nodes;
(b.2) configuring said nodes of said solution space in a topology to determine said solution for said problem;
(b.3) storing and evaluating said data for said problem within said nodes;

(b.4) traversing said topology and processing selected ones of said nodes based on said parameters to determine said solution; and
(b.5) updating said nodes and said topology based on said parameters.

14. The method of claim 13, wherein said emulated hardware architecture is dynamically reconfigurable.

15. The method of claim 14, wherein said emulated hardware architecture comprises reconfigurable elements including one or more of:
- a type and number of units in said emulated hardware architecture;
- a structure of memory;
- registers;
- data words;
- index words;
- machine instructions;
- node structure and topology; and
- a configuration unit to configure configurable elements of said emulated hardware architecture.

16. The method of claim 15, wherein a configuration of said dynamically reconfigurable hardware architecture includes one or more of an instantiation unit to create and to delete said nodes, a population unit to store and to evaluate data within said nodes, a navigation unit to traverse said topology and to retrieve information from selected nodes, a node counter, and an arithmetic logic unit to perform arithmetic operations.

17. The method of claim 13, wherein said computer system includes one or more of a conventional computing platform and a virtual-supercomputing platform.

18. The method of claim 13, wherein said computer system includes one or more of a Von Neumann computing platform and a Non-Von Neumann computing platform.

* * * * *